United States Patent
Muraoka

(10) Patent No.: US 9,516,516 B2
(45) Date of Patent: Dec. 6, 2016

(54) PATH LOSS CALCULATION METHOD, PATH LOSS CALCULATION DEVICE, PATH LOSS CALCULATION PROGRAM, WIRELESS COMMUNICATION SYSTEM, AND SPECTRUM MANAGER

(75) Inventor: Kazushi Muraoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 201 days.

(21) Appl. No.: 14/124,317

(22) PCT Filed: May 30, 2012

(86) PCT No.: PCT/JP2012/063901
§ 371 (c)(1),
(2), (4) Date: Dec. 6, 2013

(87) PCT Pub. No.: WO2012/169400
PCT Pub. Date: Dec. 13, 2012

(65) Prior Publication Data
US 2014/0112179 A1    Apr. 24, 2014

(30) Foreign Application Priority Data
Jun. 7, 2011 (JP) ................................. 2011-127739

(51) Int. Cl.
*H04W 24/02* (2009.01)
*H04W 16/14* (2009.01)
(Continued)

(52) U.S. Cl.
CPC ............ *H04W 24/02* (2013.01); *H04W 16/14* (2013.01); *H04W 24/08* (2013.01); *H04W 52/242* (2013.01)

(58) Field of Classification Search
None
See application file for complete search history.

(56) References Cited

U.S. PATENT DOCUMENTS

2005/0128970 A1    6/2005    Tsien et al.
2007/0201405 A1*   8/2007    Santhanam ........... H04W 52/10
                                                                370/335
(Continued)

FOREIGN PATENT DOCUMENTS

CN    101400118 A    4/2009
CN    101835256 A    9/2010
(Continued)

OTHER PUBLICATIONS

Muraoka et al., "Monitoring-Based Spectrum Management for Expanding Opportunities of White Space Utilization", May 2011, IEEE, pp. 277-284.*

(Continued)

*Primary Examiner* — Ayaz Sheikh
*Assistant Examiner* — Peter Chau

(57) ABSTRACT

A spectrum manager manages a secondary system that shares a frequency with a primary system. A communication unit receives a measurement value of reception power of a signal of the secondary system which is measured by a monitoring station, and holds the measurement value in a measurement result storage unit. A path loss estimating unit estimates a path loss at a first frequency, and a path loss correcting unit performs actual measurement correction on a path loss estimation value using one of a reception power measurement value of a radio signal of a secondary transmitting station measured at a second frequency different from the first frequency and a reception power measurement value of the radio signal of the secondary transmitting station measured in a period of time which is not used by the primary system. A permissible transmission power setting unit calculates permissible transmission power of the secondary transmitting station using the path loss estimation value which has been actually measured and corrected.

14 Claims, 10 Drawing Sheets

(51) Int. Cl.
*H04W 24/08* (2009.01)
*H04W 52/24* (2009.01)

(56) References Cited

U.S. PATENT DOCUMENTS

| 2008/0268892 A1* | 10/2008 | Hamdi | H04W 52/283 |
| | | | 455/522 |
| 2009/0088083 A1* | 4/2009 | Fujii | H04W 52/242 |
| | | | 455/69 |
| 2011/0059735 A1* | 3/2011 | Thiel | H04W 16/18 |
| | | | 455/423 |

FOREIGN PATENT DOCUMENTS

| CN | 101965001 A | 2/2011 |
| JP | 2008-306277 A | 12/2008 |
| JP | 2009-100452 A | 5/2009 |
| JP | 2011-24068 A | 2/2011 |
| JP | 2011-61759 A | 3/2011 |

OTHER PUBLICATIONS

"Technical and Operational Requirements for the Possible Operation of Cognitive Radio Systems in the 'White Spaces' of the Frequency Band 470-790 MHz", Electronic Communication Committee (ECC) within the European Conference of Postal and Telecommunications Administrations (CEPT), ECC Report 159, Jan. 2011, pp. 23-35. Cited in the Applicant's Specification.
Kazushi Muraoka et al., "A Cognitive Radio Mobile Network Utilising White Space Spectrum (3)—Interference Monitoring for Advanced Spectrum Management—", Proceedings of the Society Conference of IEICE, Sep. 14-17, 2010, B-17-2, with Partial English Translation. Cited in the Applicant's Specification and ISR.
International Search Report for PCT Application No. PCT/JP2012/063901, mailed on Aug. 28, 2012.
Chinese Office Action for CN Application No. 201280027696.6 dated on Jun. 3, 2016 with English Translation.

* cited by examiner

FIG. 4

| MEASUREMENT FREQUENCY | MEASUREMENT ACCURACY INFORMATION (RECEPTION POWER ESTIMATION VALUE OF PRIMARY SIGNAL) | MEASUREMENT RESULT (RECEPTION POWER ESTIMATION VALUE OF SECONDARY SIGNAL) | MEASUREMENT ACCURACY INFORMATION (RECEPTION POWER ESTIMATION VALUE OF SECONDARY SIGNAL) | MEASUREMENT RESULT (RECEPTION POWER ESTIMATION VALUE OF PRIMARY SIGNAL) |
|---|---|---|---|---|
| f4 | $C_{Mon, f4}^{Est}$ | $I_{Mon, f4}^{Meas}$ | | |
| f5 | $C_{Mon, f5}^{Est}$ | $I_{Mon, f5}^{Meas}$ | | |
| f6 | $C_{Mon, f6}^{Est}$ | $I_{Mon, f6}^{Meas}$ | $I_{Mon, f6}^{Est}$ | $C_{Mon, f6}^{Meas}$ |
| f13 | | | $I_{Mon, f13}^{Est}$ | $C_{Mon, f13}^{Meas}$ |

FIG. 5

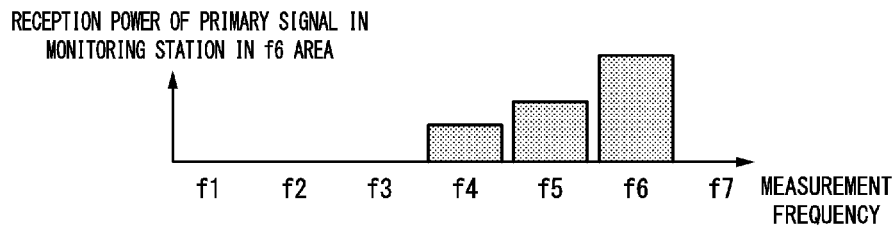

FIG. 6

| MEASUREMENT PERIOD OF TIME | MEASUREMENT ACCURACY INFORMATION (RECEPTION POWER ESTIMATION VALUE OF PRIMARY SIGNAL) | MEASUREMENT RESULT (RECEPTION POWER ESTIMATION VALUE OF SECONDARY SIGNAL) | MEASUREMENT ACCURACY INFORMATION (RECEPTION POWER ESTIMATION VALUE OF SECONDARY SIGNAL) | MEASUREMENT RESULT (RECEPTION POWER ESTIMATION VALUE OF PRIMARY SIGNAL) |
|---|---|---|---|---|
| t1 | $C_{Mon, t1}^{Est}$ | $I_{Mon, t1}^{Meas}$ | $I_{Mon, t1}^{Est}$ | $C_{Mon, t1}^{Meas}$ |
| t2 | $C_{Mon, t2}^{Est}$ | $I_{Mon, t2}^{Meas}$ | $I_{Mon, t2}^{Est}$ | $C_{Mon, t2}^{Meas}$ |
| t3 | $C_{Mon, t3}^{Est}$ | $I_{Mon, t3}^{Meas}$ | $I_{Mon, t3}^{Est}$ | $C_{Mon, t3}^{Meas}$ |

FIG. 7

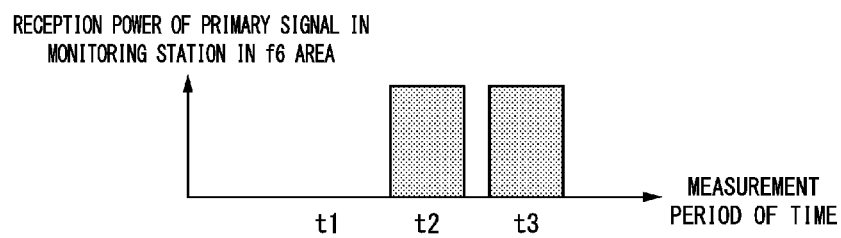

FIG. 12

| Measurement Frequency | Measurement Accuracy Information: ICR Estimation Value | Measurement Result: Reception Power Estimation Value of Secondary Signal | Measurement Accuracy Information: CIR Estimation Value | Measurement Result: Reception Power Estimation Value of Primary Signal |
|---|---|---|---|---|
| f4 | $I_{Mon, f4}^{Est} - C_{Mon, f4}^{Est}$ | $I_{Mon, f4}^{Meas}$ | / | / |
| f5 | $I_{Mon, f5}^{Est} - C_{Mon, f5}^{Est}$ | $I_{Mon, f5}^{Meas}$ | / | / |
| f6 | $I_{Mon, f6}^{Est} - C_{Mon, f6}^{Est}$ | $I_{Mon, f6}^{Meas}$ | $C_{Mon, f6}^{Est} - I_{Mon, f6}^{Est}$ | $C_{Mon, f6}^{Meas}$ |
| f13 | / | / | $C_{Mon, f13}^{Est} - I_{Mon, f13}^{Est}$ | $C_{Mon, f13}^{Meas}$ |

PATH LOSS CALCULATION METHOD, PATH LOSS CALCULATION DEVICE, PATH LOSS CALCULATION PROGRAM, WIRELESS COMMUNICATION SYSTEM, AND SPECTRUM MANAGER

This application is a National Stage Entry of PCT/JP2012/063901 filed on May 30, 2012, which claims priority from Japanese Patent Application 2011-127739 filed on Jun. 7, 2011, the contents of all of which are incorporated herein by reference, in their entirety.

TECHNICAL FIELD

The present invention relates to a path loss calculation method, a path loss calculation device, and a path loss calculation program which calculate a propagation loss between radio stations, and a wireless communication system and a spectrum manager which perform power control using a path loss value.

BACKGROUND ART

A cognitive radio of recognizing an ambient wireless environment and optimizes communication parameters according to the wireless environment has been known. As an example of a cognitive radio, for example, there are cases in which a secondary system (interfering system) shares a frequency band allocated to a primary system (interfered system).

When the secondary system shares the frequency band with the primary system, the secondary system does not have to influence existing services provided by the primary system. To this end, a transmitting station (hereinafter referred to as a "secondary transmitting station") of the secondary system performs communication with transmission power (hereinafter referred to as "permissible transmission power") which is adjusted so that a certain reception quality can be maintained in a receiving station (hereinafter referred to as a "primary receiving station") of the primary system. Here, as a reference used to maintain a certain reception quality, a technique of maintaining a carrier to interference ratio (CIR) or a carrier to interference plus noise ratio (CINR) of the primary receiving station to be equal to or more than a certain value or a technique of maintaining an interfered amount of the primary receiving station to be equal to or less than a certain value is considered.

In Non-Patent Document 1, permissible transmission power for maintaining the CIR to be equal to or more than a certain value in a receiving station of a television broadcast system serving as the primary system is discussed. In the technique disclosed in Non-Patent Document 1, the permissible transmission power is decided by estimating a path loss (propagation loss) when a signal (secondary signal) transmitted from a secondary transmitting station arrives at a primary receiving station and estimating the interfered amount of the primary receiving station caused by the secondary signal. However, since the path loss estimation includes an error caused by shadowing, an error caused by a difference between a propagation model (a path estimation formula such as the Okumura-Hata formula) and a real environment, or the like, a CIR estimation error occurs consequently. For this reason, in Non-Patent Document 1, a margin according to a CIR error value is added, and then the permissible transmission power is set. As a result, by restricting the permissible transmission power according to the CIR estimation error value, the CIR can be maintained at a certain probability.

Further, Patent Document 1 discloses a technique in which a base station device of a wireless communication system shares a common and/or adjacent frequency band with a second wireless communication system, obtains a separation frequency width between a frequency band to be used and a frequency band to be used by the second wireless communication system, obtains a separation distance between the base station device and a receiving device equipped in the second wireless communication system, and decides maximum transmission power that does not cause the communication quality of the second wireless communication system to deteriorate which is a priority system based on the separation frequency and the separation distance. In the technique disclosed in Patent Document 1, the separation distance and the estimation propagation loss amount are calculated using a free-space propagation loss formula. In the case of the technique disclosed in Patent Document 1, similarly to the technique disclosed in Non-Patent Document 1, since an error caused due to a difference with a real environment is included, a CIR estimation error occurs consequently.

Meanwhile, Non-Patent Document 2 discloses interference monitoring in which a monitoring station (in Non-Patent Document 2, described as a secondary receiving station of a secondary system) positioned around a primary receiving station measures a reception level of a secondary signal or a reception level of a primary signal transmitted from a primary transmitting station of a primary system, and uses the measured reception level for CIR estimation in the primary receiving station. In this technique, an estimation value of a path loss used in the technique disclosed in Non-Patent Document 1 is actually measured and corrected using the reception level of the secondary signal or the primary signal measured by the monitoring station. Through the correction of the estimation value of the path loss using the measurement result, the CIR estimation error can be reduced, a margin necessary for suppression of the permissible transmission power can be reduced, and thus the permissible transmission power can be increased. Further, since the monitoring station is used for measurement, there is an advantage of improving the CIR estimation accuracy in the primary receiving station without changing the receiving station of the primary system which is the priority system.

DOCUMENTS FOR THE PRIOR ART

Patent Documents

[Patent Document 1]
Japanese Unexamined Patent Application, First Publication No. 2009-100452

Non Patent Document

[Non Patent Document 1]
Electronic Communications Committee (ECC) within the European Conference of Postal and Telecommunications Administrations (CEPT), "TECHNICAL AND OPERATIONAL REQUIREMENTS FOR THE POSSIBLE OPERATION OF COGNITIVE RADIO SYSTEMS IN THE WHITE SPACES OF THE FREQUENCY BAND 470-790 MHz", ECC Report 159, pp 23-35, January, 2011.

[Non Patent Document 2]
Kazushi Muraoka et al. "A Cognitive Radio Mobile Network Utilizing White Space Spectrum (3)—Interference Monitoring for Advanced Spectrum Management—" IEICE Society Conference, B-17-2, September 2010.

DISCLOSURE OF INVENTION

Problems to be Solved by the Invention

However, in the technique disclosed in Non-Patent Document 2, there are cases in which a measurement error becomes a problem when the monitoring station measures the reception level of the secondary signal. This is because transmission is performed in the state in which the permissible transmission power is set so that the reception level of the secondary signal in the monitoring station is lower than the reception level of the primary signal transmitted at the same frequency band (a required CIR is secured). In this case, since it is necessary to measure the reception level of the secondary signal in the frequency band in which the primary signal of the high reception level exists, the secondary signal is affected by the primary signal, and it is difficult to accurately measure the reception level. If there is a large measurement error in the measured reception level, it is difficult to reduce the CIR estimation error even when the path loss is corrected using the measurement result. Thus, it is likely to be difficult to reduce the margin necessary for suppression of the permissible transmission power.

The present invention has been made to solve the above problems, and it is an object of the present invention to provide a path loss calculation method, a path loss calculation device, a path loss calculation program, a wireless communication system, and a spectrum manager, which are capable of correcting the estimation value of the path loss until the secondary signal reaches the primary receiving station with a high degree of accuracy.

Means for Solving the Problem

In order to solve the above problems, a path loss calculation method according to the present invention includes estimating a path loss value between a transmitting station of a first wireless system and a receiving station of a second wireless system staying in a service area of a transmitting station of the second wireless system at a first frequency, measuring, at a monitoring station in or around the service area, a reception power value of a radio signal of the transmitting station of the first wireless system which is transmitted at a second frequency of the transmitting station of the second wireless system different from the first frequency or a reception power value of a radio signal of the transmitting station of the first wireless system which is transmitted in a period of time in which the transmitting station of the second wireless system does not use the first frequency, and correcting the estimated path loss value using a measurement value of the reception power of the signal of the first wireless system.

A path loss calculation device according to the present invention includes a device that estimates a path loss value between a transmitting station of an first wireless system and a receiving station of a second wireless system staying in a service area of a transmitting station of the second wireless system at a first frequency, and a device that corrects the estimated path loss value using either a measurement value of reception power of a radio signal of the transmitting station of the first wireless system which is transmitted at a second frequency of the transmitting station of the second wireless system different from the first frequency or a measurement value of reception power of a radio signal of the transmitting station of the first wireless system which is transmitted in a period of time in which the transmitting station of the second wireless system does not use the first frequency.

A path loss calculation program according to an aspect of the present invention a step of estimating a path loss value between a transmitting station of an first wireless system and a receiving station of a second wireless system staying in a service area of a transmitting station of the second wireless system at a first frequency and a step of correcting the estimated path loss value using either a measurement value of reception power of a radio signal of the transmitting station of the first wireless system which is transmitted at a second frequency of the transmitting station of the second wireless system different from the first frequency or a measurement value of reception power of a radio signal of the transmitting station of the first wireless system which is transmitted in a period of time in which the transmitting station of the second wireless system does not use the first frequency, wherein the measurement values are measured by a monitoring station in or around the service area.

A wireless communication system according to an aspect of the present invention is a wireless communication system in which a secondary system shares the same frequency as a frequency of a transmitting station of a primary system, and permissible power of a transmission signal of the secondary system is controlled so that the transmission signal of the secondary system does not cause the primary system to undergo interference, the primary system includes at least a transmitting station of the primary system and a receiving station of the primary system, the secondary system includes a transmitting station of the secondary system, a spectrum manager that manages a transmission signal received from the transmitting station of the secondary system, and a monitoring station that is arranged in or around a service area of the transmitting station of the primary system and measures the reception power of the transmission signal received from the transmitting station of the secondary system, and the spectrum manager estimates a path loss value between the transmitting station of the secondary system and the receiving station of the primary system at a first frequency, corrects the estimated path loss value between the transmitting station of the secondary system and the receiving station of the primary system using a reception power value of a radio signal of the transmitting station of the secondary system which is transmitted on a second frequency of the transmitting station of the primary system different from the first frequency or a reception power value of the transmission signal received from the transmitting station of the secondary system which is transmitted in a period of time in which the transmitting station of the primary system does not use the first frequency, and calculates permissible transmission power of the transmitting station of the secondary system using the corrected path loss value.

A spectrum manager according to an aspect of the present invention is a spectrum manager that manages a secondary system that shares the same frequency as a frequency of a transmitting station of a primary system, and includes a communication unit that receives a reception power value measured by a monitoring station positioned in or around a service area of the transmitting station of the primary system, a path loss estimating unit that estimates a path loss value between the transmitting station of the secondary system and the receiving station of the primary system at a first frequency, a measurement result storage unit that holds the reception power value measured by the monitoring station, a path loss correcting unit that corrects the estimated path loss value between the transmitting station of the secondary system and the receiving station of the primary system using a reception power value of a radio signal of the transmitting station of the secondary system which is transmitted at a second frequency of the transmitting station of the primary system different from the first frequency or using a reception power value of a radio signal of the transmitting station of the secondary system which is transmitted in a period of time in which the transmitting station of the primary system does not use the first frequency, and a permissible power setting unit that calculates permissible transmission power of the transmitting station of the secondary system using the corrected path loss value.

Effect of the Invention

According to the present invention, the path loss value at the first frequency corresponding to the frequency used by the primary receiving station of the protection target is estimated, and the reception power of the secondary signal measured by the monitoring station at another second frequency different from the first frequency or in a period of time which is not used when the first frequency is used is used for actual measurement correction of the path loss. As a result, it is possible to measure the secondary signal in the environment in which the primary reception power is small, and the measurement error can be reduced. Since the estimation value of the path loss in the propagation path from the secondary transmitting station to the primary receiving station can be corrected with a high degree of accuracy, as a result, in the wireless system in which the primary system and the secondary system share the same frequency, the margin necessary for suppression of the permissible transmission power can be reduced, and the permissible transmission power can be set to be as high as possible.

BRIEF DESCRIPTION OF DRAWINGS

FIG. 4 is a diagram showing an exemplary frequency-associated measurement result held in a frequency/time-associated measurement result storage unit.

FIG. 5 is a diagram showing the reception power of a primary signal for each frequency.

FIG. 6 is a diagram showing an exemplary time-associated measurement result held in a frequency/time-associated measurement result storage unit.

FIG. 7 is a diagram showing reception power of a primary signal for each time.

FIG. 12 shows an exemplary frequency-associated measurement result held in a/time-associated measurement result storage unit according to a second embodiment of the present invention.

EMBODIMENTS FOR CARRYING OUT THE INVENTION

Hereinafter, exemplary embodiments of the present invention will be described with reference to the appended drawings.

<First Embodiment>

Figure 1:
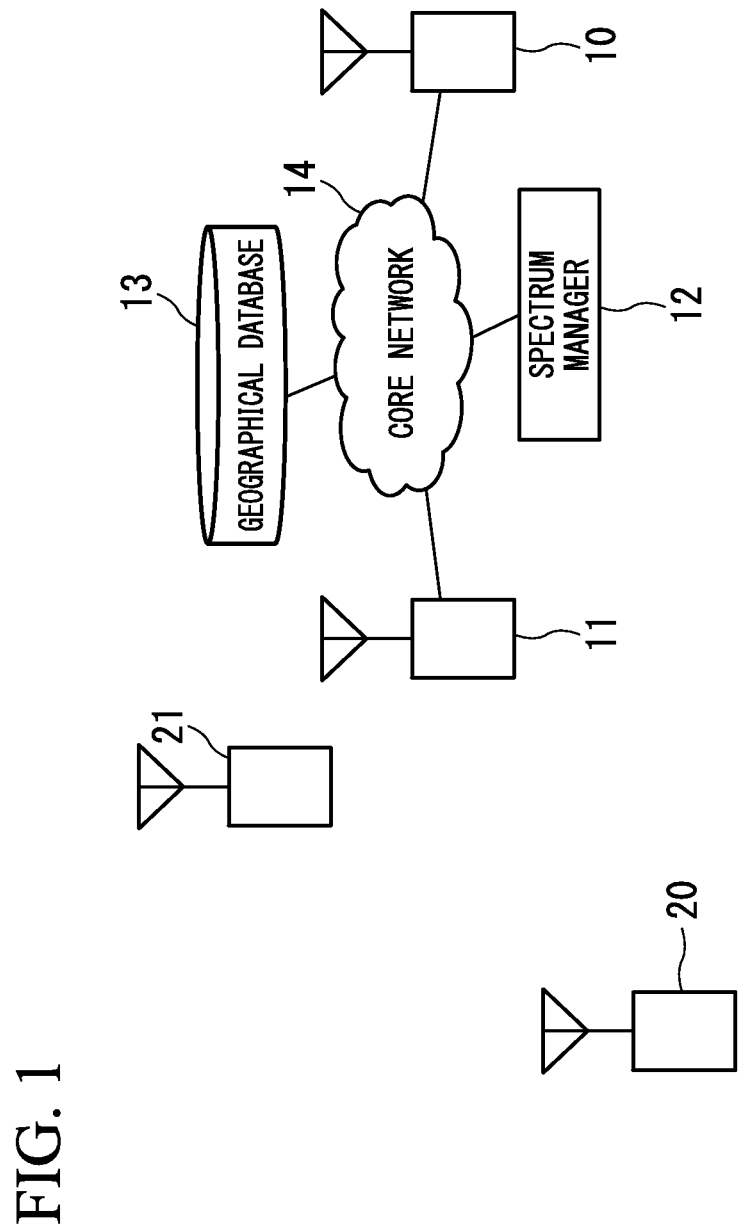
FIG. 1 is a system constitution diagram showing an exemplary constitution of a secondary system according to a first embodiment of the present invention.

FIG. 1 is a system constitution diagram illustrating an exemplary cognitive radio system according to a first frequency of the present invention. The cognitive radio system performs communication as a secondary system by sharing a frequency with a primary system. In the following description, the primary system is assumed to be a television broadcast system, and the secondary system is assumed to be a cellular system. Of course, this constitution is merely an example, and a combination of the primary system and the secondary system is not limited to such a constitution. Examples of the combination of the primary system and the secondary system include a combination of a television system and a wireless regional access network (WRAN) system and a television system and a wireless regional system or disaster prevention radio communication of a self-governing community or the like. In these examples, the primary system may be a wireless microphone or a radio for specific use (for example, a radio for a multiple dwelling complex, a self-managed company radio, or a radio for agriculture), and the secondary system may be a wireless local area network (LAN). Further, the constitution according to the first embodiment of the present invention is not necessarily limited only to a combination of wireless systems which differ in priority to use the frequency such as the primary system and the secondary system and may be a constitution in which the frequency is shared between wireless systems which are the same in priority.

Referring to FIG. 1, the primary system includes a primary transmitting station 20 and a primary receiving station 21. Here, one primary receiving station 21 is shown, but a plurality of primary receiving stations 21 may be provided.

The secondary system includes a secondary transmitting station 10, a spectrum manager 12, a monitoring station 11, a geographical database 13, and a core network 14.

There are cases in which the secondary system includes a second constitution (for example, a receiving station of the secondary system serving as a communication counterpart of the secondary transmitting station 10), but since this does not relate directly to an embodiment of the present invention, it is omitted in FIG. 1 for clarity of description.

The secondary transmitting station 10 secondarily uses the frequency band of the primary system in order to perform communication. At this time, the secondary transmitting station 10 transmits a secondary use request (that designates a time or a frequency to be secondarily used) to the spectrum manager 12 via the core network 14, and the spectrum manager 12 designates permissible transmission power as a response thereto.

The secondary system performs communication by sharing the frequency with the primary system. Here, when the transmission power designated from the secondary transmitting station 10 is high, the primary system is interfered with, and thus it is difficult for the primary receiving station 21 to receive a signal from the primary transmitting station 20 at an appropriate quality. In this regard, in an embodiment of the present invention, the secondary transmitting station 10 performs transmission at a transmission power equal to or less than the permissible transmission power, and thus an interference amount of the secondary transmitting station 10 is limited so that the primary receiving station 21 can maintain a certain reception quality even when the frequency is shared between the secondary system and the primary system.

In the following, this reception quality is referred to as a carrier to interference ratio (CIR) of the primary receiving station 21. The maximum transmission power at which the CIR of the primary receiving station 21 is equal to or more than a certain value is assumed to be set as the permissible transmission power of the secondary transmitting station 10. Through this constitution, even when the secondary transmitting station 10 performs transmission using the same frequency as the frequency used in the primary transmitting station 20, the primary receiving station 21 can receive the signal from the primary transmitting station 20 while maintaining a certain reception quality.

Further, the permissible transmission power of the secondary transmitting station 10 is updated by actually measuring and correcting a path loss estimation value as will be described later. In order to allow the spectrum manager 12 to actually measure and correct the path loss estimation value and select the monitoring station 11, the secondary transmitting station 10 notifies the spectrum manager 12 of transmission power and an in-use frequency.

The monitoring station 11 is positioned around the primary receiving station 21, and measures the reception power of the secondary signal transmitted from the secondary transmitting station 10 and reception power of the primary signal transmitted from the primary transmitting station 20. The measured reception power is transmitted to the spectrum manager 12 via the core network 14. As will be described later, the measured reception power is used for correction of the path loss estimation value.

Here, the secondary transmitting station 10 and the monitoring station 11 may be, for example, base stations, relay stations, or terminal stations in the cellular system. Further, the monitoring station 11 may be a station (a monitoring sensor) dedicated to monitoring.

The following description will proceed with an example in which the secondary transmitting station 10 and the monitoring station 11 are base stations and can use a core network. In FIG. 1, only one monitoring station 11 is shown, but a plurality of monitoring stations are assumed to be arranged in a plane like base stations of the cellular system.

The spectrum manager 12 basically has a function of managing use of the frequency of the secondary system.

In other words, the spectrum manager 12 notifies the secondary transmitting station 10 that requests to secondarily use the frequency band of the primary system of the permissible transmission power which can be used at each of the available frequencies.

Further, the spectrum manager 12 receives information related to an in-use frequency (or information related a frequency which is scheduled to be used) from the secondary transmitting station 10, and transmits a measurement request to the monitoring station 11. At this time, the spectrum manager 12 selects one or more of the monitoring stations 11 that are to actually perform measurement from among a plurality of monitoring stations 11, and transmits the measurement request to the selected monitoring station 11. A method of selecting the monitoring station 11 will be described later.

Further, the spectrum manager 12 calculates a path loss estimation value between the secondary transmitting station 10 and the primary receiving station 21 and a path loss estimation value between the primary transmitting station 20 and the primary receiving station 21 Further, the spectrum manager 12 receives the reception power measurement value of the primary signal transmitted from the primary transmitting station 20 and the reception power measurement value of the secondary signal transmitted from the secondary transmitting station 10 in the monitoring station 11 via the core network 14, and holds the measurement results. Here, the reception power value measured by the monitoring station 11 is used as the measurement result, but a result of quantizing the reception power value or another value (for example, a correlation value between a pilot signal and a reception signal) having a proportional relation to the reception power may be used. Then, the spectrum manager 12 selects the measurement result appropriate for correction of the path loss estimation value among the held measurement results based on the measurement accuracy information, and performs actual measurement correction of the path loss estimation value. At this time, in the first embodiment of the present invention, as will be described later, path loss estimation is performed using a first frequency corresponding to a frequency used by the primary receiving station 21 of a protection target, and the reception power of the secondary signal measured at a second frequency different from the first frequency or the reception power value of the secondary signal which is measured at the same frequency in a period of time different from a period of time used by the primary receiving station is used for actual measurement correction of a path loss. As a result, the path loss estimation value can be actually measured and corrected with a high degree of accuracy.

Further, the spectrum manager 12 calculates the permissible transmission power using the path loss estimation value which has been actually measured and corrected, transmits the permissible transmission power to the secondary transmitting station 10, and sets the permissible transmission power of the secondary transmitting station 10. In other words, the spectrum manager 12 estimates the reception power of the primary signal and the reception power of the secondary signal in the primary receiving station 21 using the path loss estimation value from the primary transmitting station 20 to the primary receiving station 21 and the path loss estimation value from the secondary transmitting station 10 to the primary receiving station 21 which have been actually measured and corrected, and sets the maximum transmission power at which the CIR is equal to or more than a certain value as the permissible transmission power of the secondary transmitting station 10.

The spectrum manager 12 may be a single device or may be equipped in a single device such as the secondary transmitting station 10 or the monitoring station 11 as a function. Further, the respective functions of the spectrum manager 12 may be separately equipped in the secondary transmitting station 10 and the monitoring station 11 as functions.

The geographical database 13 stores certain information (for example, information related to the position of a radio station, coverage of a radio station, transmission power, the height of an antenna, or directivity of an antenna) related to the primary system and the secondary system. The geographical database 13 provides such information to the request source (for example, the spectrum manager 12, the secondary transmitting station 10, or the monitoring station 11) as necessary. Here, the geographical database 13 may include a plurality of separate database devices in order to separately manage information of the primary system and information of the secondary system. Further, the geographical database 13 may be a device into which some (for example, a frequency/time-associated measurement result storage unit 104 which will be described later) or all functions of the spectrum manager 12 are integrated.

The core network 14 is a network in which the secondary transmitting station 10, the monitoring station 11, the spectrum manager 12, and the geographical database 13 perform communication. The network may be a core network constituted by a communication service provider or a network constituted by a plurality of communication service providers. Further, the network may be a wired network or a wireless network.

Figure 2:
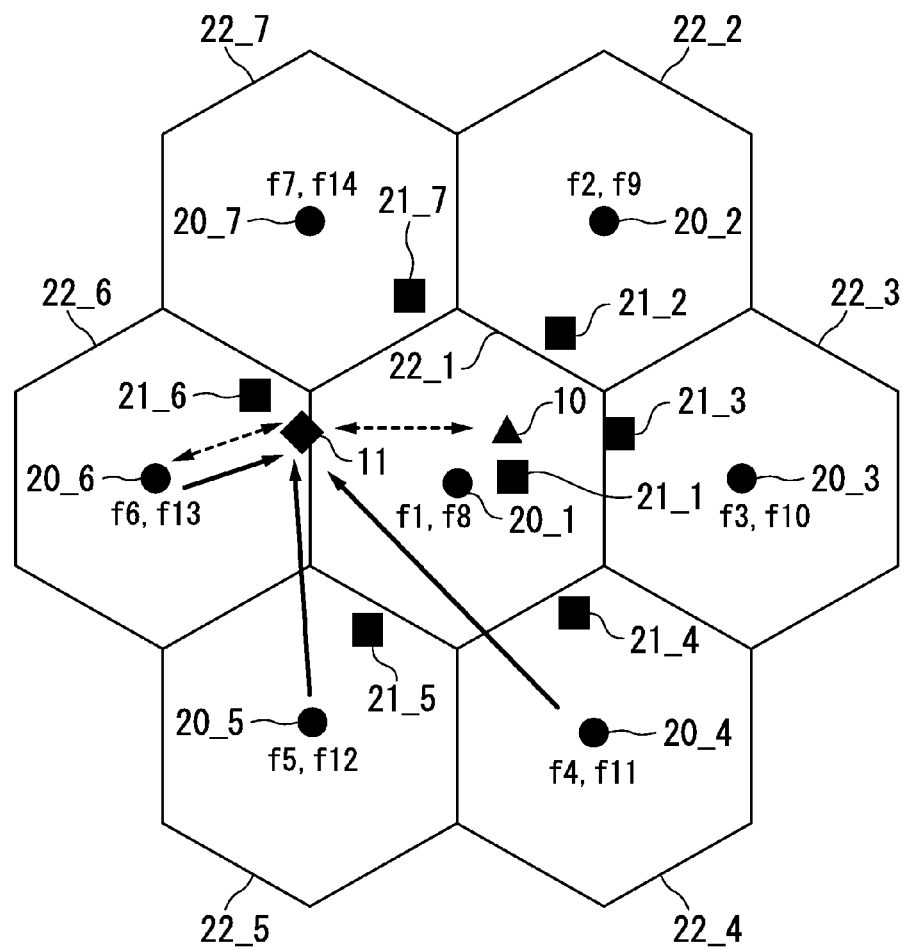
FIG. 2 is a system constitution diagram showing an exemplary relation between a primary system and a secondary system according to the first embodiment of the present invention.

FIG. 2 is a system constitution diagram illustrating an exemplary geographical relation between the primary system and the secondary system.

In FIG. 2, the primary transmitting stations 20 (20_1 to 20_7), the primary receiving stations 21 (21_1 to 21_7), the primary system service area 22 (22_1 to 22_7), the secondary transmitting station 10, and the monitoring station 11 are shown. The primary transmitting stations 20 (20_1 to 20_7) and the primary receiving stations 21 (21_1 to 21_7) constitute the primary system. The secondary transmitting station 10 and the monitoring station 11 constitute the secondary system.

The primary transmitting stations 20_1 to 20_7 are transmitting stations that use frequencies f1 to f14, and a plurality of stations are shown. In FIG. 2, the primary transmitting station 20_1 is assumed to use the frequencies f1 and f8, the primary transmitting station 20_2 is assumed to use the frequencies f2 and f9, the primary transmitting station 20_3 is assumed to use the frequencies f3 and f10, the primary transmitting station 20_4 is assumed to use the frequencies f4 and f11, the primary transmitting station 20_5 is assumed to use the frequencies f5 and f12, the primary transmitting station 20_6 is assumed to use the frequencies f6 and f13, and the primary transmitting station 20_7 is assumed to use the frequencies f7 and f14. For example, in broadcasting stations of a television broadcast system, a plurality of frequencies are allocated to broadcasting in each station, similarly to FIG. 2. A method of allocating a frequency is not limited to this example.

The respective primary receiving stations 21_1 to 21_7 are shown in the respective primary system service areas 22_1 to 22_7, but in practice, a plurality of primary receiving stations are present in a service area.

The primary system service areas 22_1 to 22_7 are represented by service areas divided into hexagonal cells, and service areas of two frequencies used by each of the primary transmitting stations 20_1 to 20_7 are assumed to have the same size. The primary system service areas 22_1 to 22_7 may be designed such that geographically adjacent service areas overlap or may be designed such that one of service areas is positioned to be included in a plurality of service areas of a second transmitting station.

The secondary transmitting station 10 is assumed to be positioned in the primary system service area 22_1 in which the frequencies f1 and f8 are used and secondarily use the frequency f6 at that position.

The monitoring station 11 is considered to be a monitoring station that is arranged around the position at which influence of interference is large (for example, the position close to the secondary transmitting station 10) when the secondary transmitting station 10 uses the frequency f6. In practice, a plurality of monitoring stations 11 are developed throughout the region.

In the example of FIG. 2, when the secondary transmitting station 10 uses the frequency f6, the monitoring station 11 arranged around the position at which influence of interference is maximum measures reception power of a signal transmitted from the secondary transmitting station 10 and reception power of the primary signal transmitted from the primary transmitting station 20_6. Then, the reception power measurement values are transmitted to the spectrum manager 12.

The spectrum manager 12 corrects the path loss estimation value between the secondary transmitting station 10 and the primary receiving station 21_6 and the path loss estimation value between the primary transmitting station 20_6 and the primary receiving station 21_6 using the measurement results. Then, the spectrum manager 12 decides the permissible transmission power of the secondary transmitting station 10 so that the primary system can be protected at the position at which the influence of interference is maximized in the primary system service area 22_6 of the frequency f6.

Figure 3:
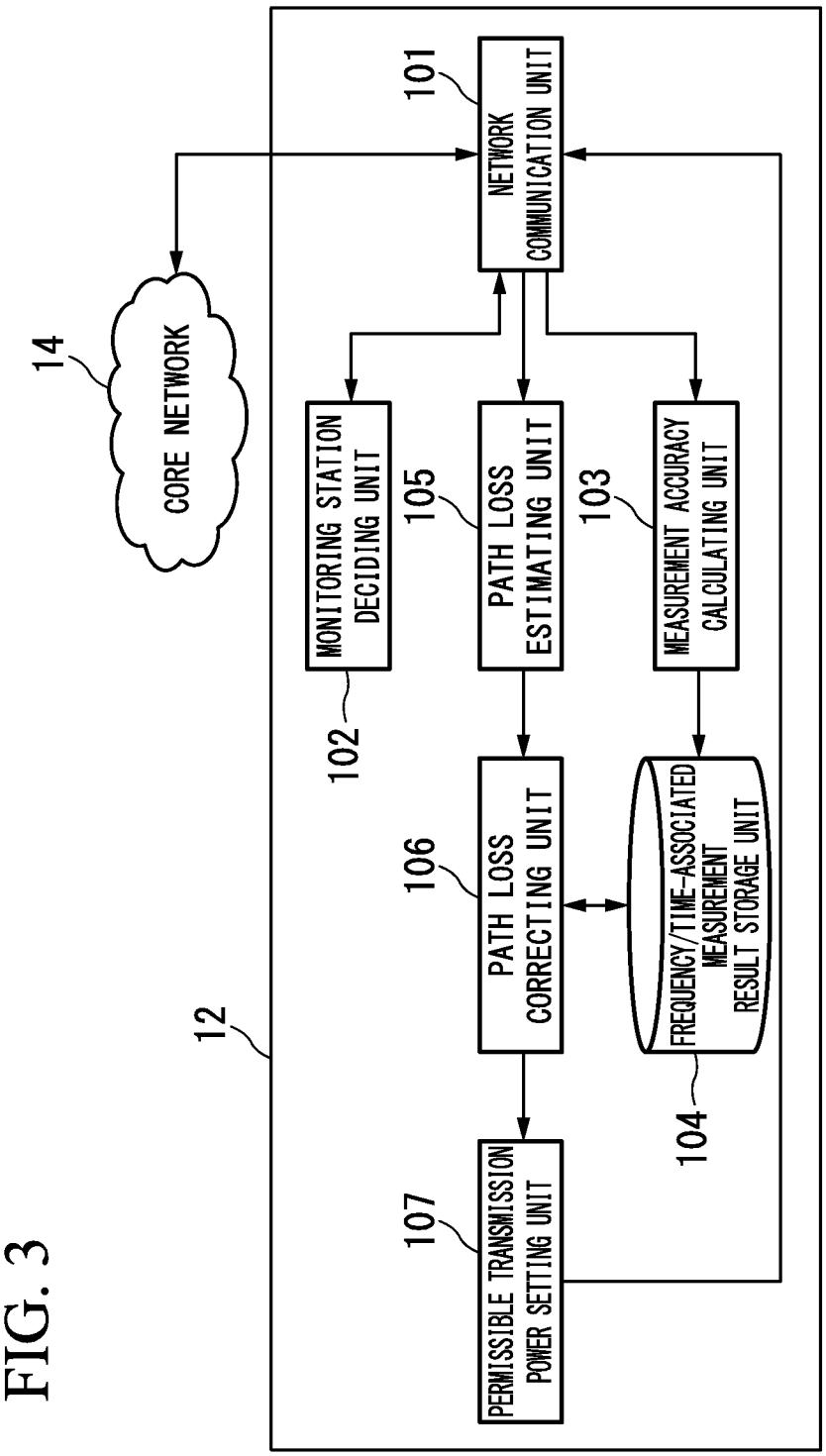
FIG. 3 is a block diagram showing an exemplary constitution of a spectrum manager.

FIG. 3 is a block diagram illustrating a constitution of the spectrum manager 12. The spectrum manager 12 includes a network communication unit 101, a monitoring station deciding unit 102, a measurement accuracy calculating unit 103, a frequency/time-associated measurement result storage unit 104, a path loss estimating unit 105, a path loss correcting unit 106, and a permissible transmission power setting unit 107 as illustrated in FIG. 3.

The network communication unit 101 has a function through which respective components of the spectrum manager 12 perform communication with a second device (for example, the secondary transmitting station 10, the monitoring station 11, or the geographical database 13) via the core network 14.

The monitoring station deciding unit 102 receives notification representing a frequency which is being used by the secondary transmitting station 10 or a frequency which is decided to be used by the secondary transmitting station 10, and decides the monitoring station 11 that is to measure the corresponding radio signal. The monitoring station deciding unit 102 transmits a measurement request to the decided monitoring station 11 and designates a frequency at which measurement is performed. As a measurement frequency designated by the measurement request, a frequency used to measure the secondary signal and a frequency used to measure the primary signal may be separately set.

The measurement accuracy calculating unit 103 has a function of calculating measurement accuracy information using the measurement result received from the monitoring station 11 as an input and storing the measurement result and the measurement accuracy information in the frequency/time-associated measurement result storage unit 104. The calculation of the measurement accuracy information will be described later.

The frequency/time-associated measurement result storage unit 104 has a function of storing the measurement results in association with each period of time (measurement period of time) in which measurement is performed and each frequency (measurement frequency) at which measurement is performed. The measurement results are held in association with each combination of the secondary transmitting station 10 and the monitoring station 11.

The path loss estimating unit 105 has a function of receiving the secondary use request transmitted from the secondary transmitting station 10 and calculating the path loss estimation value between the secondary transmitting station 10 and the primary receiving station 21 using a propagation model corresponding to each of frequencies serving as a secondary use candidate. The path loss estimating unit 105 further has a function of calculating the path loss estimation value between the primary transmitting station 20 and the primary receiving station 21.

The path loss correcting unit 106 performs actual measurement correction of the path loss estimation value based on the measurement results held in the frequency/time-associated measurement result storage unit 104. In the first embodiment of the present invention, the path loss correcting unit 106 performs actual measurement correction using the reception power measurement value of the secondary signal when the path loss estimation value between the secondary transmitting station 10 and the primary receiving station 21 is corrected. In the path loss estimation performed by the path loss estimating unit 105, the path loss estimation is performed using a frequency (first frequency) corresponding to a frequency used by the primary receiving station of the protection target. On the other hand, the path loss correcting unit 106 uses the reception power of the secondary signal which has been transmitted at a frequency (second frequency) different from a frequency used by the primary receiving station 21 of the protection target and measured by the monitoring station 11 or reception power which has been transmitted in a period of time different from a period of time used by the primary receiving station 21 of the protection target and measured by the monitoring station 11 as the reception power measurement value of the secondary signal. Further, the path loss estimation value between the primary transmitting station 20 and the primary receiving station 21 is estimated using a third frequency, and the reception power measurement value of the primary signal is used for actual measurement correction. As the reception power measurement value of the primary signal, reception power which has been transmitted from the primary transmitting station 20 at a frequency (a fourth frequency) different from a frequency used by the secondary transmitting station (the secondary transmitting station 10 or another secondary transmitting station) and measured by the monitoring station 11 or reception power which has been transmitted from the primary transmitting station 20 at the same frequency in a period of time different from a period of time used by the secondary transmitting station 10 and measured by the monitoring station 11 is used.

Further, when correcting the path loss estimation value between the secondary transmitting station 10 and the primary receiving station 21, the path loss correcting unit 106 uses a measurement value of reception power which is determined as having a high measurement accuracy based on the measurement accuracy information when the reception power measurement results of the secondary signal measured at a plurality of frequencies including a frequency used by the primary receiving station 21 of the protection target are available or when the reception power measurement results of the secondary signal measured in a plurality of periods of time including a period of time used by the primary receiving station 21 of the protection target are available. Here, the reception power estimation value of the primary signal in the monitoring station 11 which is calculated using the propagation model is used as the measurement accuracy information of the reception power value of the secondary signal, and the reception power measurement value of the secondary signal which is smallest in the reception power estimation value of the primary signal is used for actual measurement correction. The actual measurement correction is performed such that the path loss estimation value from the secondary transmitting station 10 to the primary receiving station 21 is corrected using a difference value between the reception power estimation value of the secondary signal and the reception power estimation value of the secondary signal as a correction value.

Meanwhile, when correcting the path loss estimation value between the primary transmitting station 20 and the primary receiving station 21, the path loss correcting unit 106 uses the measurement value of the reception power which is determined as having the high measurement accuracy based on the measurement accuracy information as described above when the primary reception power measurement values measured at a plurality of frequencies including a frequency used by the secondary transmitting station 10 are available or when the primary reception power measurement values obtained in a plurality of periods of time including a period of time used by the secondary transmitting station 10 are available. In this case, the reception power estimation value of the secondary signal in the monitoring station 11 which is calculated using the propagation model is used as the measurement accuracy information of the reception power value of the primary signal, and the reception power measurement value of the primary signal which is smallest in the reception power estimation value of the secondary signal is used for actual measurement correction. The actual measurement correction is performed such that the path loss estimation value from the primary transmitting station 20 to the primary receiving station 21 is corrected using a difference value between the reception power estimation value of the primary signal and the reception power measurement value of the primary signal as a correction value.

The permissible transmission power setting unit 107 estimates the reception power of the primary signal and the reception power of the secondary signal in the primary receiving station 21 using the path loss estimation value from the primary transmitting station 20 to the primary receiving station 21 and the path loss estimation value from the secondary transmitting station 10 to the primary receiving station 21 which have been actually measured and corrected, and sets the maximum transmission power at which the CIR is equal to or more than a certain value as the permissible transmission power of the secondary transmitting station 10.

Next, processing of each of the measurement accuracy calculating unit 103, the frequency/time-associated measurement result storage unit 104, the path loss estimating unit 105, the path loss correcting unit 106, and the permissible transmission power setting unit 107 equipped in the spectrum manager 12 illustrated in FIG. 3 will be described in detail.

As described above, the measurement accuracy calculating unit 103 performs processing for calculating the measurement accuracy information using the measurement result received from the monitoring station 11 as an input and storing the measurement result and the measurement accuracy information in the frequency/time-associated measurement result storage unit 104. A method of calculating the measurement accuracy through the measurement accuracy calculating unit 103 will be described below.

First, calculation of the measurement accuracy of the reception power measurement value of the secondary signal will be described. In the first embodiment of the present invention, the reception power estimation value of the primary signal in the monitoring station 11 which is calculated based on the path loss estimation using the propagation model is used as the measurement accuracy information of the reception power measurement value of the secondary signal.

In other words, a reception power estimation value $C_{Mon}^{Est}$ of the primary signal in the monitoring station 11 may be calculated by the following formula:

$$C_{Mon}^{Est} = P_{Pri} + G_{Pri}^{Tx} - L_{Pri\text{-}Mon} + G_{Pri\text{-}Mon}^{Rx} \qquad (1)$$

Here, $P_{Pri}$ represents transmission power of the primary transmitting station 20 at a frequency or in a period of time (measurement frequency/measurement period of time) in which measurement is performed in the monitoring station 11, $G_{Pri}^{Tx}$ represents a gain of a transmitting antenna of the primary transmitting station 20, $L_{Pri\text{-}Mon}$ represents a path loss estimation value between the primary transmitting station 20 and the monitoring station 11 calculated using the propagation model, and $G_{Pri\text{-}Mon}^{Rx}$ represents a gain of a receiving antenna of the monitoring station 11 facing the primary transmitting station 20. A frequency (or a wavelength) corresponding to a frequency used by primary receiving station of the protection target is used as the frequency (or a wavelength) in the propagation model.

A unit of each term is dB or dBm, and this applies similarly to a variable in the following description. The path loss estimation value between the primary transmitting station 20 and the monitoring station 11 may be calculated using a propagation model in which a distance between the primary transmitting station 20 and the monitoring station 11 (which can be calculated based on positional information of each station), the height of an antenna of each station, and the like are used as parameters. For example, the transmission power information, the transmitting antenna gain, the transmitting antenna height, and the positional information of the primary transmitting station 20 and the receiving antenna gain and the positional information of the monitoring station 11 are assumed to be held in the geographical database 13 and acquired via the core network 14 for use. Similarly, in the following description, when the calculation of the reception power estimation value and the calculation of the path loss estimation value are performed, necessary information is assumed to be acquired from the geographical database 13.

When the reception power estimation value of the primary signal in the monitoring station 11 is low, since it is an environment in which reception power of a signal other than the secondary signal is low, the measurement error is reduced, and the measurement accuracy can be determined to be high. However, when the reception power estimation value of the primary signal in the monitoring station 11 is high, since it is an environment in which reception power of a signal other than the secondary signal is high, the measurement error increases, and the measurement accuracy can be determined to be low. Thus, when the reception power estimation value of the primary signal is obtained as in Formula (1), the reception power estimation value of the primary signal can be used as the measurement accuracy information of the reception power measurement value of the secondary signal.

The measurement accuracy of the reception power measurement value of the secondary signal has been described above, but the reception power estimation value of the secondary signal in the monitoring station 11 which is calculated based on the path loss estimation using the propagation model is used as the measurement accuracy information of the reception power measurement value of the primary signal.

Similarly to Formula (1), the reception power estimation value of the secondary signal is calculated based on the transmission power of the secondary transmitting station 10 at a frequency or in a period of time in which the monitoring station 11 performs measurement, the transmitting antenna gain of the secondary transmitting station 10, the path loss estimation value between the secondary transmitting station 10 and the monitoring station 11, and a gain of the receiving antenna of the monitoring station 11 facing the secondary transmitting station 10.

The transmission power at the measurement frequency or in the measurement period of time in which the monitoring station performs measurement is acquired from the secondary transmitting station 10 as the secondary signal transmission power. Further, the path loss estimation value between the secondary transmitting station 10 and the monitoring station 11 may be calculated using the propagation model in which the distance between the secondary transmitting station 10 and the monitoring station 11 (which can be calculated based on positional information of each station), the height of an antenna of each station, and the like are used as parameters.

As described above, the measurement accuracy calculating unit 103 calculates the reception power estimation value of the primary signal which is calculated based on the propagation model as the measurement accuracy information of the reception power measurement value of the secondary signal, and calculates the reception power estimation value of the secondary signal which is calculated based on the propagation model as the measurement accuracy information of the reception power measurement value of the primary signal. The measurement accuracy information calculated as described above is held in the frequency/time-associated measurement result storage unit 104.

FIG. 4 illustrates exemplary frequency-associated measurement results held in the frequency/time-associated measurement result storage unit 104 when the primary system and the secondary system are arranged as illustrated in FIG. 2. In this example, reception power measurement values of the secondary signal transmitted from the secondary transmitting station 10 at the frequencies f4, f5, and f6 and reception power measurement values of the primary signal transmitted from the primary transmitting station 20_6 at the frequencies f6 and f13 are shown as the measurement results.

As illustrated in FIG. 4, the reception power estimation value of the primary signal is held as the measurement accuracy information of the reception power measurement value of the secondary signal. As the reception power estimation value of the primary signal increases, the measurement error of the secondary signal increases, and the measurement accuracy decreases.

As illustrated in FIG. 2, the primary transmitting station 20_4 of the frequency f4 is positioned in the primary system service area 22_4, the primary transmitting station 20_5 of the frequency f5 is positioned in the primary system service area 22_5, and the primary transmitting station 20_6 of the frequency f6 is positioned in the primary system service area 22_6. The reception powers of the monitoring station 11 at the frequencies f4, f5, and f6 in this case are shown in FIG. 5.

Since the primary transmitting station 20_4 is apart from the monitoring station 11, the reception power estimation value of the primary signal at the frequency f4 is small, and the measurement accuracy of the reception power measurement value of the secondary signal at the frequency f4 is high. Since the primary transmitting station 20_5 is closer to the monitoring station 11 than the primary transmitting station 20_4, the measurement accuracy of the reception power measurement value of the secondary signal at the frequency f5 is lower than that at the frequency f4. On the other hand, since the primary transmitting station 20_6 is close to the monitoring station 11, the reception power estimation value of the primary signal at the frequency f6 is high, and the measurement accuracy of the reception power measurement value of the secondary signal at the frequency f6 is low.

The above description has been made in connection with the example in which the measurement result and the measurement accuracy measured for each frequency are held in the frequency/time-associated measurement result storage unit 104, but the measurement result and measurement accuracy measured for each period of time may be held in the frequency/time-associated measurement result storage unit 104.

Similarly, for the reception power measurement value of the primary signal transmitted from the primary transmitting station 20_6, the reception power measurement value of the secondary signal is used as the measurement accuracy information, and as the reception power estimation value of the secondary signal increases, the measurement error of the primary signal increases, and the measurement accuracy decreases.

FIG. 6 illustrates exemplary period of time-based measurement results held in the frequency/time-associated measurement result storage unit 104. The example of FIG. 6 is different from the example of FIG. 4 in that a result of performing measurement at a certain measurement frequency is held in association with a period of time.

FIG. 7 illustrates an example in which the reception power estimation values of the primary signal illustrated in FIG. 6 are displayed for each measurement period of time. For example, different times are illustrated such that a time t1 is 3 o'clock, a time t2 is 11 o'clock, and a time t3 is 19 o'clock. Here, the time t1 is assumed to correspond to a period of time in which the primary transmitting station does not perform transmission (for example, a period of time in which television broadcasting is suspended), and thus the reception power of the primary signal is assumed to be zero (0). In this case, since the reception power estimation value of the primary signal at the time t1 is small (0), the measurement accuracy of the reception power measurement value of the secondary signal at the time t1 is high. The reception power estimation value of the primary signal at the time t2 or t3 is large, and the measurement accuracy of the reception power measurement value of the secondary signal at the time t2 or t3 is high.

FIG. 4 and FIG. 6 may be combined, and in this case, measurement results classified in association with the measurement frequency (f4, f5, and f6) and the period of time (the times t1, t2, and t3) in which measurement is performed may be held in the frequency/time-associated measurement result storage unit 104.

Next, processing of the path loss estimating unit 105 in the spectrum manager 12 illustrated in FIG. 3 will be described. As described above, the path loss estimating unit 105 receives the secondary use request transmitted from the secondary transmitting station 10, and calculates the path loss estimation value between the secondary transmitting station 10 and the primary receiving station 21 for each frequency serving as a secondary use candidate. Further, the path loss estimating unit 105 may calculate the path loss estimation value between the primary transmitting station 20 and the primary receiving station 21 as well.

The path loss estimated by the path loss estimating unit 105 is assumed to correspond to information such as a frequency or a period of time included in the secondary use request. For example, a period of time is designated according to whether the secondary transmitting station 10 secondarily uses a frequency at a current time or is to secondarily use a frequency in the future. Further, it is possible to designate a frequency (a frequency which is scheduled to be secondarily used) to be used for estimation of a path loss through the secondary transmitting station 10. Further, information designating a frequency or a period of time may not be included in the secondary use request of the secondary transmitting station 10, and instead, path loss estimation may be performed on all secondary use candidate frequencies.

The following description will be made in connection with the example in which one secondary use candidate frequency is set as a target of path loss estimation, path loss correction, and permissible transmission power setting, and when there are a plurality of secondary use candidate frequencies as described above, the same operation is performed on each of the frequencies.

First of all, when the secondary transmitting station 10 uses the secondary use candidate frequency, the path loss estimating unit 105 specifies the position of the primary receiving station 21 that gives the highest interference.

For example, in FIG. 2, the secondary use candidate frequency is assumed to be f6. In this case, among the primary system service areas 22_1 to 22_7, the primary system service area 22_6 that uses the same frequency f6 as the frequency to be secondarily used gives interference. Further, in the primary system service area 22_6 of the frequency f6, the interference amount is considered to be highest in the primary receiving station 21_6 positioned at the edge of the service area closes to the secondary transmitting station 10. The primary receiving station 21_6 arranged at the specified position is set as the primary receiving station of the protection target.

The number of primary receiving stations which are the protection target need not necessarily be one, and a plurality of primary receiving stations 21 which are the protection target may be present in an area estimated as having interference equal to or more than a certain value.

Then, the path loss estimating unit 105 calculates the path loss estimation value between the secondary transmitting station 10 and the primary receiving station 21_6 using a propagation model in which the distance between the secondary transmitting station 10 and the primary receiving station 21_6 (which can be calculated based on positional information of each station), the height of an antenna of each station, and the like are used as parameters. Further, the path loss estimating unit 105 calculates the path loss estimation value between the primary transmitting station 20_6 and the primary receiving station 21_6 using a propagation model in which the distance between the primary transmitting station 20_6 and the primary receiving station 21_6 (which can be calculated based on positional information of each station), the height of an antenna of each station, and the like are used as parameters.

The path loss estimation values calculated as described above and the positional information of the primary receiving station 21_6 of the protection target are output from the path loss estimating unit 105 and then input to the path loss correcting unit 106.

The path loss correcting unit 106 performs actual measurement correction on the path loss estimation value between the secondary transmitting station 10 and the primary receiving station 21_6 input from the path loss estimating unit 105. Further, actual measurement correction may be performed on the path loss estimation value between the primary transmitting station 20 and the primary receiving station 21_6 as well.

The processing of the path loss correcting unit 106 will be described in further detail. The path loss correcting unit 106 performs the following processing when actual measurement correction is performed on the path loss estimation value between the secondary transmitting station 10 and the primary receiving station 21_6.

First, the path loss correcting unit 106 compares the input positional information of the primary receiving station 21_6 with the positional information of the monitoring station 11, and specifies a neighboring monitoring station 11.

Then, the path loss correcting unit 106 searches for whether the measurement result of the reception power of the secondary transmitting station 10 measured by the monitoring station 11 is held in the frequency/time-associated measurement result storage unit 104.

In the first embodiment of the present invention, the path loss correcting unit 106 performs actual measurement correction using the reception power measurement value of the secondary signal when correcting the path loss estimation value between the secondary transmitting station 10 and the primary receiving station of the protection target (the primary receiving station 21_6 in the example of FIG. 2). As the reception power measurement value of the secondary signal, the reception power of the secondary signal which has been transmitted at a frequency different from a frequency used by the primary receiving station 21_6 of the protection target and measured by the monitoring station 11 or the reception power which has been transmitted in a period of time different from a period of time used by the primary receiving station 21_6 of the protection target and measured by the monitoring station 11 is used. Further, when the path loss correction between the primary transmitting station 20 and the primary receiving station 21_6 is corrected, actual measurement correction using the reception power measurement value of the primary signal is performed. As the reception power measurement value of the primary signal, reception power which has been transmitted from the primary transmitting station 20 at a frequency different from a frequency used by the secondary transmitting station 10 and measured by the monitoring station 11 or reception power which has been transmitted from the primary transmitting station 20 at the same frequency in a period of time different from a period of time used by the secondary transmitting station 10 and measured by the monitoring station 11 is used.

For example, in the example of FIG. 2, when the frequency f6 is shared between the primary system and the secondary system, the primary receiving station 21_6 is regarded as the receiving station of the protection target. When the path loss correcting unit 106 corrects the path loss estimation value between the secondary transmitting station 10 and the primary receiving station 21_6, the reception power measurement value of the secondary signal which has been transmitted at a frequency different from the frequency f6 and measured by the monitoring station 11 or the reception power measurement value of the secondary signal which has been transmitted at the frequency f6 in a period of time different from a period of time in which the primary signal is transmitted (that is, a period of time in which the primary signal is not transmitted) and measured by the monitoring station 11 is used for path loss correction. Meanwhile, when the secondary transmitting station 10 performs transmission at the frequency f6 and the path loss correcting unit 106 corrects the path loss estimation value between the primary transmitting station 20_6 and the primary receiving station 21_6, the reception power measurement value of the primary signal which has been transmitted at a frequency (f13 in the example of FIG. 2) which is used by the primary transmitting station 20_6 but different from the frequency f6 and measured by the monitoring station 11 or the reception power measurement value of the secondary signal which has been transmitted at the frequency f6 in a period of time different from a period of time in which the secondary signal is transmitted and measured by the monitoring station 11 is used for path loss correction.

Further, when correcting the path loss estimation value between the secondary transmitting station 10 and the primary receiving station 21_6, the path loss correcting unit 106 uses a measurement value of reception power which is determined as having a high measurement accuracy based on the measurement accuracy information when the reception power measurement results of the secondary signal measured at a plurality of frequencies including a frequency used by the primary receiving station 21_6 are available or when the reception power measurement results of the secondary signal obtained in a plurality of periods of time including a period of time used by the primary receiving station 21 are available. As described above, the reception power estimation value of the primary signal in the monitoring station 11 which is calculated using the propagation model is used as the measurement accuracy information of the reception power value of the secondary signal, and the reception power measurement value of the secondary signal which is smallest in the reception power estimation value of the primary signal is used for actual measurement correction. The actual measurement correction is performed such that the path loss estimation value from the secondary transmitting station 10 to the primary receiving station 21_6 is corrected using a difference value between the reception power estimation value of the secondary signal and the reception power estimation value of the secondary signal as a correction value.

Meanwhile, when correcting the path loss estimation value between the primary transmitting station 20 and the primary receiving station 21_6, the path loss correcting unit 106 uses the correction value of the reception power which is determined as having the high measurement accuracy based on the measurement accuracy information as described above when the primary reception power measurement values measured at a plurality of frequencies including a frequency used by the secondary transmitting station 10 are available or when the primary reception power measurement values obtained in a plurality of periods of time including a period of time used by the secondary transmitting station 10 are available. As described above, in this case, the reception power estimation value of the secondary signal in the monitoring station 11 which is calculated using the propagation model is used as the measurement accuracy information of the reception power value of the primary signal, and the reception power measurement value of the primary signal which is smallest in the reception power estimation value of the secondary signal is used for actual measurement correction. The actual measurement correction is performed such that the path loss estimation value from the primary transmitting station 20 to the primary receiving station 21 is corrected using a difference value between the reception power estimation value of the primary signal and the reception power measurement value of the primary signal as a correction value.

For example, when the primary receiving station 21_6 of the protection target uses the frequencies f6 and f13 as illustrated in FIG. 2, the frequency/time-associated measurement result storage unit 104 is assumed to store the measurement results according to each measurement frequency (f4, f5, and f6) as illustrated in FIG. 4 for correction of the path loss estimation value between the secondary transmitting station 10 and the primary receiving station 21_6. At this time, the reception power estimation value of the primary signal at the frequency f4 among the measurement frequencies is smallest as illustrated in FIG. 5, and the accuracy of the reception power measurement value of the secondary signal at the frequency f4 is highest. In this case, the reception power measurement value of the secondary signal at the frequency f4 is used for path loss correction.

Meanwhile, as illustrated in FIGS. 6 and 7, when the measurement results are held in the frequency/time-associated measurement result storage unit 104 according to each period of time, the reception power estimation value of the primary signal measured at the measure time t1 is about zero (0) and smallest. In this case, the accuracy of the reception power measurement value of the secondary signal at the measure time t1 is high, and the reception power measurement value of the secondary signal at the time t1 is used for path loss correction.

As described above, in the first embodiment of the present invention, when the path loss estimation value between the secondary transmitting station 10 and the primary receiving station 21_6 is corrected, the reception power measurement value of the secondary signal which is smallest in the reception power estimation value of the primary signal used as the measurement accuracy information is used for correction of the path loss estimation value, and in this case, since the ratio of the reception power of the secondary signal among signals included in the same band can be increased, the measurement error can be reduced. Similarly, when the path loss estimation value between the primary transmitting station 20 and the primary receiving station 21_6 is corrected, the reception power measurement value of the primary signal which is smallest in the reception power estimation value of the secondary signal used as the measurement accuracy information may be used for correction of the path loss estimation value, and in this case, since the ratio of the reception power of the primary signal among signals included in the same band can be increased, the measurement error can be reduced.

In the above-described example, the reception power estimation value of the primary signal is used as the measurement accuracy information of the reception power measurement value of the secondary signal, but the reception power measurement value of the primary signal measured by the monitoring station 11 may be used as secondary measurement accuracy information. In this case, similarly to when the reception power estimation value of the primary signal is used as the measurement accuracy information, the reception power measurement value of the secondary signal which is smallest in the reception power measurement value of the primary signal may be used for actual measurement correction, and in this case, since the ratio of the reception power of the secondary signal among signals included in the same band can be increased, the measurement error can be reduced. Further, the reception power estimation value of the secondary signal in the monitoring station 11 may be used as secondary measurement accuracy information. In this case, since the reception power measurement value of the secondary signal which is large in the reception power estimation value of the secondary signal is expected to be large in actual reception power, the measurement error can be reduced by using the measurement value for actual measurement correction.

Similarly, in the above example, the reception power estimation value of the secondary signal is used as the measurement accuracy information of the reception power measurement value of the primary signal, but the reception power measurement value of the secondary signal measured by the monitoring station 11 may be used as secondary measurement accuracy information. In this case, similarly to when the reception power estimation value of the secondary signal is used as the measurement accuracy information, the reception power measurement value of the primary signal which is smallest in the reception power measurement value of the secondary signal may be used for actual measurement correction, and in this case, since the ratio of the reception power of the primary signal among signals included in the same band can be increased, the measurement error can be reduced. Further, the reception power estimation value of the primary signal in the monitoring station 11 may be used as secondary measurement accuracy information. In this case, since the reception power measurement value of the primary signal which is large in the reception power estimation value of the primary signal is expected to be large in actual reception power, the measurement error can be reduced by using the measurement value for actual measurement correction.

The reception power estimation value of the primary signal may be used. In this case, the reception power measurement value of the primary signal which is largest in the reception power estimation value of the primary signal may be used for actual measurement correction, and in this case, since the ratio of the reception power of the primary signal among signals included in the same band can be increased, the measurement error can be reduced.

Then, the path loss correcting unit 106 performs actual measurement correction on the path loss estimation value from the secondary transmitting station 10 to the primary receiving station 21_6 and the path loss estimation value between the primary transmitting station 20 and the primary receiving station 21_6 using the measurement result determined as having the high measurement accuracy. Next, performing actual measurement correction on the path loss estimation value between the secondary transmitting station 10 and the primary receiving station 21_6 will be described.

The reception power measurement value of the secondary signal in the monitoring station 11 at a frequency (or a period of time) which is smallest in the reception power estimation value of the primary signal is represented by $I_{Mon}^{Meas}$. A correction value $\Delta$ used to perform actual measurement correction on the path loss estimation value from the secondary transmitting station 10 to the primary receiving station 21_6 is calculated using the measurement result. The correction value $\Delta$ is calculated as a difference value between the reception power measurement value of the secondary signal and the reception power estimation value of the secondary signal as can be seen in the following formula:

$$\Delta = I_{Mon}^{Est} - I_{Mon}^{Meas} \quad (2)$$

Here, $I_{Mon}^{Est}$ represents the reception power estimation value of the secondary signal in the monitoring station 11 at a frequency (or a period of time) which is smallest in the reception power estimation value of the primary signal. The correction value $\Delta$ of the path loss estimation may be stored in the frequency/time-associated measurement result storage unit 104.

The correction value $\Delta$ is used for correction of the path loss estimation value between the secondary transmitting station 10 and the primary receiving station 21_6. Specifically, the correction is performed according to the following formula:

$$L'_{Sec-Pri} = L_{Sec-Pri} + w \cdot \Delta \quad (3)$$

Here, $L_{Sec-Pri}$ represents the path loss estimation value from the secondary transmitting station 10 to the primary receiving station 21_6 at the frequency f6, $L'_{Sec-Pri}$ represents the corrected path loss estimation value, and w is a weight coefficient ($0 \leq w \leq 1$) of a correction value.

Here, for example, the weight coefficient is decided according to a correlation of a propagation environment between the monitoring station 11 and the secondary transmitting station 10. For example, the correction value is further reflected such that when the distance between the monitoring station 11 and the secondary transmitting station 10 is large and the correlation of the propagation environment is low, the weight is reduced, and when the distance is small, the weight is increased.

Further, a correlation of a propagation environment by a frequency difference between a frequency (a measurement frequency) of a measurement result used for calculation for a correction value and a frequency (a secondary use candidate frequency) of a path loss estimation value of a correction target may be reflected in the weight coefficient.

For example, when the frequency difference is large, since the correlation of the propagation environment is reduced, the weight coefficient can be reduced, and when the frequency difference is small, since the correlation of the propagation environment is increased, the weight coefficient can be increased. Further, a correlation of a propagation environment by a time difference between a time (a measurement time) of a measurement result used for calculation of a correction value and a time (for example, a current time) in which secondary use is actually performed may be reflected in the weight coefficient. For example, because the path loss varies according to a time as radio reflection by an ionospheric layer in the daytime differs from that at night, the weight coefficient w may be decided based on the time difference between the measurement time and the current time.

The corrected path loss estimation value obtained as described above is output from the path loss correcting unit 106 to the permissible transmission power setting unit 107.

The correction of the path loss estimation value can be applied to path loss estimation values from the secondary transmitting station 10 to a plurality of primary receiving stations as well as the path loss estimation value from the secondary transmitting station 10 to the single primary receiving station 21_6.

For example, the primary system service areas 22 (22_1 to 22_7) of the interference protection target in FIG. 2 are divided in the form of a lattice (for example, 100 m×100 m), the primary receiving station 21 is considered to be positioned at each lattice point of an area considered to have large interference, path losses for the plurality of primary receiving stations 21 are estimated, and actual measurement correction is performed. At this time, a measurement result used for correction of the path loss estimation value for each primary receiving station 21 need not necessarily be a measurement result obtained by the single monitoring station 11, and measurement results obtained by the individual monitoring stations which are close to the respective primary receiving stations 21 may be used. Further, actual measurement correction of the path loss estimation value may be performed using measurements result obtained by the plurality of monitoring stations 11.

The above description has been made in connection with the example in which actual measurement correction is performed on the path loss estimation value between the secondary transmitting station 10 and the primary receiving station 21_6, but actual measurement correction can be similarly performed on the path loss estimation value between the primary transmitting station 20_6 and the primary receiving station 21_6. In this case, the reception power measurement value of the primary signal stored in the frequency/time-associated measurement result storage unit 104 is used as the measurement result.

Here, the primary signal is a signal transmitted from the primary transmitting station (for example, 20_6 in FIG. 2) that performs transmission to the primary receiving station 21 of the protection target, and does not mean a primary signal transmitted from any other primary transmitting station (for example, 20_1 to 20_5 and 20_7 in FIG. 2) arranged at a different position.

The path loss correcting unit 106 performs the path loss correction using the actually measured value as described above.

The corrected path loss estimation values (the path loss estimation value between the secondary transmitting station 10 and the primary receiving station 21_6 and the path loss estimation value between the primary transmitting station 20_6 and the primary receiving station 21_6) are transferred from the path loss correcting unit 106 to the permissible transmission power setting unit 107.

For example, in an initial state, there are cases in which measurement usable for correction of the path loss estimation value is not performed, and the frequency/time-associated measurement result storage unit 104 has no appropriate measurement result. In this case, the actual measurement correction is not performed, and an original path loss estimation value is input to the permissible transmission power setting unit 107.

Next, processing performed by the permissible transmission power setting unit 107 of the spectrum manager 12 illustrated in FIG. 3 will be described. The permissible transmission power setting unit 107 receives the corrected path loss estimation value from the secondary transmitting station 10 to the primary receiving station 21_6 and the corrected path loss estimation value from the primary transmitting station 20_6 to the primary receiving station 21_6. The permissible transmission power setting unit 107 sets a permissible transmission power $P_{Sec,Max}$ using the corrected path loss estimation values as follows.

$$P_{Sec,Max} = (P_{Pri} + G_{Pri}^{Tx} - L'_{Pri-Pri} + G_{Pri-Pri}^{Rx}) - (G_{Sec}^{Tx} - L'_{Sec-Pri} + G_{Sec-Pri}^{Rx}) - CIR_{req} - q\sigma \quad (4)$$

Here, $P_{Pri}$ represents the transmission power of the primary transmitting station 20_6 that uses the secondary use candidate frequency, $G_{Pri}^{Tx}$ represents the transmitting antenna gain of the primary transmitting station 20_6, $L'_{Pri\text{-}Pri}$ represents the corrected path loss estimation value from the primary transmitting station 20_6 to the primary receiving station 21_6, and $L'_{Sec\text{-}Pri}$ represents the corrected path loss estimation value from the secondary transmitting station 10 to the primary receiving station 21_6.

Further, $G_{Pri\text{-}Pri}^{Rx}$ and $G_{Sec\text{-}Pri}^{Rx}$ are receiving antenna gains of the primary receiving station 21, and represent a gain in a direction from which the primary signal comes and a gain in a direction from which the secondary signal comes. A direction from which each signal comes is calculated based on a positional relation between the primary receiving station 21 and the primary transmitting station 20 and a positional relation between the primary receiving station 21 and the secondary transmitting station 10, and an antenna gain is calculated.

Further, $CIR_{req}$ is a CIR required for protection of the primary receiving station 21_6 and is assumed to be decided for each primary system. Further, σ is a standard deviation related to the CIR estimation error when the corrected path loss estimation value is considered to be used, and q is a coefficient according to a probability that a required CIR can be secured. Thus, qσ corresponds to a margin set for the permissible transmission power so that the CIR of the primary receiving station 21_6 can satisfy a required CIR at a certain probability. Further, for example, when a CIR estimation error has the Gaussian distribution and the required CIR is considered to be secured at 95%, a value of q is 1.645.

Further, Formula (4) represents the permissible transmission power for securing the required CIR at a certain probability in the single primary receiving station 21_6 that uses the secondary use candidate frequency. As a method of protecting a plurality of primary receiving stations 21_6 in the same secondary use candidate frequency, the permissible transmission power s of Formula (4) for the respective primary receiving stations 21_6 may be calculated, and among the calculated powers, the minimum power may be used as a final permissible transmission power.

The permissible transmission power obtained as described above is transferred to the secondary transmitting station 10 via the core network 14, and the secondary transmitting station 10 sets transmission power equal to or less than the permissible transmission power.

Figure 8:
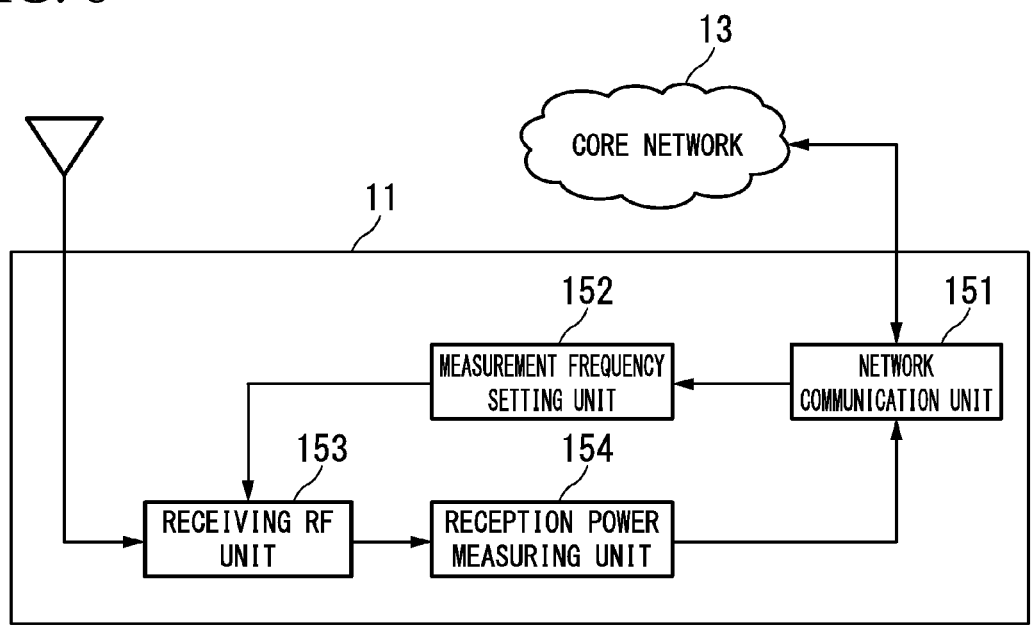
FIG. 8 is a block diagram showing an exemplary constitution of a monitoring station.

FIG. 8 is a block diagram illustrating an exemplary constitution of the monitoring station 11. The monitoring station 11 includes a network communication unit 151, a measurement frequency setting unit 152, a receiving RF unit 153, and a reception power measuring unit 154. Further, a component (for example, a circuit that performs wireless communication between a base station and a terminal when the monitoring station 11 is a base station) that does not relate directly to the present invention is omitted for clear description.

The network communication unit 151 is used when the monitoring station 11 perform communication with a second device (for example, the spectrum manager 12) via the core network 14.

The measurement frequency setting unit 152 receives the measurement request from the spectrum manager via the core network 14. Then, the measurement frequency setting unit 152 outputs the frequency (measurement frequency) for which the measurement request has been received to the receiving RF unit 153.

The "measurement frequency" is a frequency used to measure a signal transmitted from the secondary transmitting station 10 or the primary transmitting station 20, and different from a frequency of a downlink signal which the monitoring station 11 transmits a terminal which is under control thereof as a base station or a frequency of an uplink signal received from a terminal. Further, as the measurement frequency designated by the measurement request, a frequency used to measure the secondary signal and a frequency used to measure the primary signal may be separately set.

The receiving RF unit 153 includes a band pass filter, a low-noise amplifier, a frequency transform unit that performs frequency transform of a radio frequency (RF) band signal and a baseband signal, an analog to digital (A/D) converter, and the like therein.

The receiving RF unit 153 restricts reception of a radio wave other than a measurement frequency band among radio signals which have been input from the antenna and subjected to setting of a frequency (a center frequency and a frequency bandwidth) of the band pass filter by the measurement frequency setting unit 152. The receiving RF unit 153 further converts an extracted signal of the measurement frequency band into a digital baseband signal, and outputs the digital baseband signal to the reception power measuring unit 154.

Further, an RF signal or an intermediate frequency (IF) signal may be input depending on the measurement method of the reception power measuring unit 154.

The reception power measuring unit 154 receives the digital baseband signal of the measurement frequency from the receiving RF unit 153, and calculates the reception power of the measurement target signal. Here, the measurement target signal is the secondary signal or the primary signal.

Any method capable of measuring the reception power of the secondary signal or the reception power of the primary signal can be used as the reception power measuring method.

For example, when a second signal (for example, the primary signal) is not transmitted while a measurement target signal (for example, the secondary signal) is being transmitted, the reception power of the measurement target signal may be measured by directly measuring the reception power of the measurement frequency and subtracting noise power included in the frequency band.

When the secondary signal and the primary signal are simultaneously transmitted at the measurement frequency, a method of separately measuring power of respective signals is used. For example, a method of measuring power using a mutual correlation value obtained based on a sliding correlation between the pilot signal and the reception signal of the measurement target signal may be used. Specifically, a correlation value is calculated based on a sliding correlation between an actually received pilot signal and a known pilot signal, a maximum correlation value is obtained, and reception power of the pilot signal is estimated based on the value.

Here, the reception power of the pilot signal may be calculated by holding a table representing a correspondence relation between the maximum correlation value and the reception power of the pilot signal in advance and searching the table using the obtained maximum correlation value as a key. When the ratio which the transmission power of the pilot signal occupies in total transmission power (a total transmission power value of a pilot signal or a data signal) is known, the reception power of the measurement target signal may be estimated based on the reception power of the pilot signal in the monitoring station 11. For example, the ratio of the transmission power of the pilot signal to the total transmission power may be used through notification from the secondary transmitting station 10 to the monitoring station 11 via the core network 14. Meanwhile, the reception power of the pilot signal is transferred to the spectrum manager 12, and the spectrum manager 12 may acquire the ratio of the transmission power of the pilot signal to the total transmission power from the secondary transmitting station 10, calculate the reception power of the measurement target signal of the reception power of the pilot signal, and calculate the correction value of the path loss estimation value using the value of the reception power.

Figure 9:
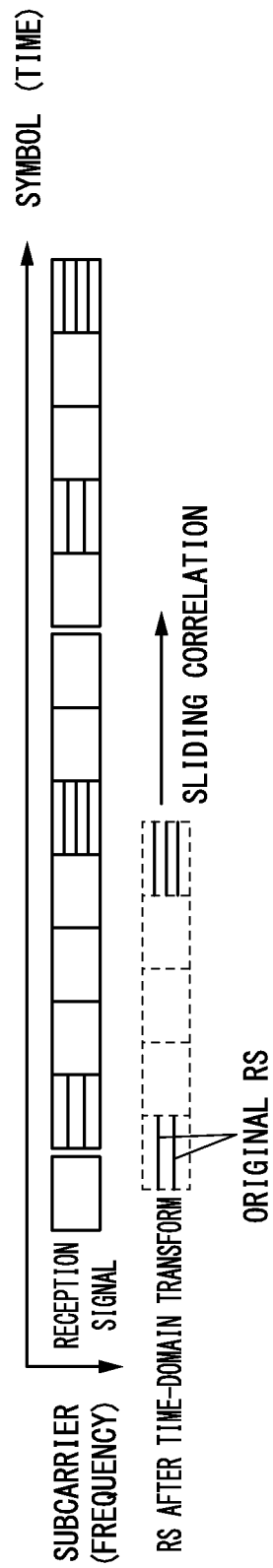
FIG. 9 is a conceptual diagram showing a sliding correlation of a pilot signal.

FIG. 9 is a conceptual diagram for describing a sliding correlation. The vertical axis represents a subcarrier (frequency), and the horizontal axis represents a symbol (time). An upper portion represents a reception signal, and a lower portion represents a reference signal (RS) which has undergone a time-domain transform. For example, when a transmission signal of the secondary transmitting station 10 is a long term evolution (LTE) downlink signal and the monitoring station 11 measures reception power of this signal, the spectrum manager 12 notifies the monitoring station to which a monitoring request is to be transmitted of a cell identification (ID) of the secondary transmitting station 10. The monitoring station 11 generates a reference signal (RS) (which is a known pilot signal used for channel estimation or the like and attached to the cell ID) associated with the notified cell ID, and transforms the RS into a time-domain signal. The monitoring station 11 performs a sliding correlation using the time-domain RS as in the following Formula:

$$T_{max} = \max_{0 \le n \le N-1} \left| \frac{1}{K} \sum_{k=0}^{K-1} y(n+k) i_P^*(k) \right| \quad (5)$$

The monitoring station 11 obtains pilot reception power by calculating a maximum correlation value $T_{max}$ based on a sliding correlation between a complex conjugate ($i^*_p(k)$) of the RS signal that has undergone the time-domain transform and a reception signal (y(n+k)) through a calculation formula illustrated in Formula (5) and by searching the table using the maximum correlation value as a key. In Formula (5), K represents a sequence length of the time-domain RS.

The monitoring station 11 transmits the reception power measurement value of the pilot signal (or the reception power of the measurement target signal) calculated as described above to the spectrum manager 12.

Figure 10:
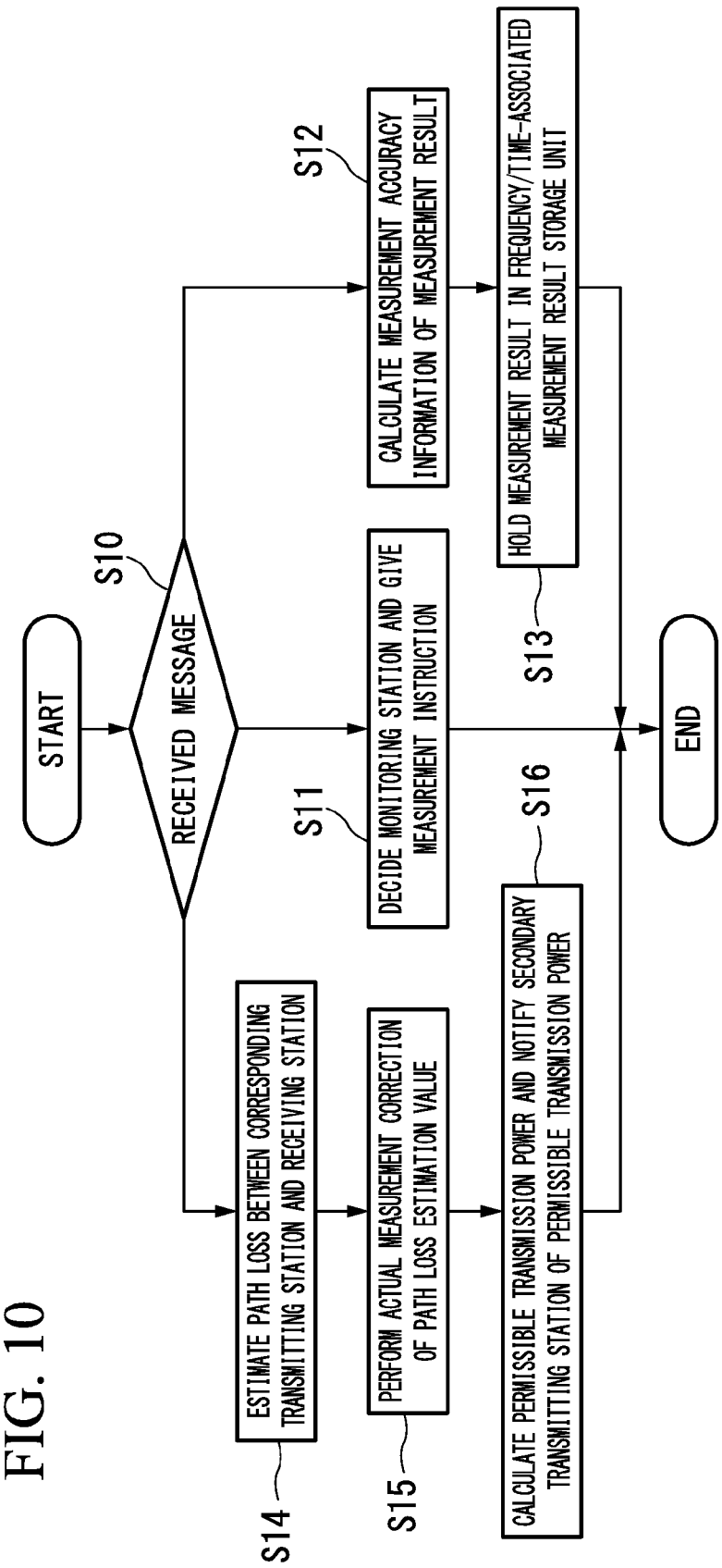
FIG. 10 is a flowchart showing exemplary processing of a spectrum manager.

FIG. 10 is a flowchart illustrating an exemplary operation of the spectrum manager 12. First of all, the network communication unit 101 of the spectrum manager 12 receives any one of information (transmission power, a frequency, a time, a cell ID, or the like) related to a frequency being used or scheduled to be used which is transmitted from the secondary transmitting station 10, the measurement result (the reception power measurement value of the secondary signal or the reception power measurement value of the primary signal) transmitted from the monitoring station 11, and the secondary use request (which also includes a frequency, a time, or the like) transmitted from the secondary transmitting station 10 (step S10).

When the message received in step S10 is information related to the in-use frequency which is transmitted from the secondary transmitting station 10, the monitoring station deciding unit 102 of the spectrum manager 12 decides the monitoring station 11 that is to perform measurement, and transmits the measurement request to the decided monitoring station 11 (step S11).

Next, a method of deciding the monitoring station 11 will be described. As described above, not only the reception power measurement value of the secondary signal measured by the monitoring station 11 at a frequency (or in a period of time) used by the primary receiving station 21 which is the protection target when the secondary transmitting station 10 performs transmission but also the reception power measurement value of the secondary signal measured by the monitoring station 11 at a different frequency (or in a different period of time) such as an adjacent frequency is used for the path loss correction in the spectrum manager 12.

In this regard, the spectrum manager 12 causes the monitoring station in the service area of the different frequency to measure the reception power of the signal of the secondary transmitting station 10 in addition to the monitoring station 11 in the primary system service area 22 in which transmission from the secondary transmitting station 10 functions as interference.

For example, in FIG. 2, since the secondary transmitting station 10 uses the frequency f6, it causes the primary system service area 22_6 to undergo interference, but in addition to the monitoring station 11 in this service area, the monitoring stations in the primary system service areas 22_1 to 22_5 and 22_7 are requested to measure the reception power of the secondary signal of the frequency f6. The measuring of the reception power may be performed in all the monitoring stations.

Further, for example, the measuring may be performed only by the monitoring station (the monitoring station positioned around each primary receiving station illustrated in FIG. 2) positioned in the area having the large influence of interference among the service areas of the respective frequencies. As described above, as the reception power of the secondary signal transmitted at the frequency f6 is measured, it is possible to measure the reception power of the secondary signal transmitted from the secondary transmitting station 10 in advance, and it is possible to measure the reception power of the primary signals transmitted from the primary transmitting stations (20_1 to 20_5 and 20_7) in the respective service areas at the respective frequencies (f1 to f5 and f7 to f14) in advance. Thus, when the secondary transmitting station 10 uses the frequencies f1 to f5 and f7 to f14, the actual measurement correction of the path loss estimation value can be performed using the reception power measurement value of the secondary signal previously measured at the frequency f6 or the reception power measurement value of the primary signal measured at the frequencies f1 to f5 and f7 to f14.

When the message received in step S10 is the measurement result (the reception power measurement value of the secondary signal or the reception power measurement value of the primary signal) transmitted from the monitoring station 11, the measurement accuracy calculating unit 103 of the spectrum manager 12 first calculates the measurement accuracy information for the measurement result (step S12). In the embodiment of the present invention, the reception power estimation value of the primary signal is used as the measurement accuracy information of the reception power measurement value of the secondary signal, and the reception power estimation value of the secondary signal is used as the measurement accuracy information of the reception power measurement value of the primary signal.

Then, the measurement accuracy calculating unit 103 stores information such as the calculated measurement result, the measurement accuracy information, the measurement frequency, and the measurement period of time in the frequency/time-associated measurement result storage unit 104 (step S13).

When the message received in step S10 is the secondary use request transmitted from the secondary transmitting station 10, the path loss estimating unit 105 specifies the primary receiving station 21 of the protection target having the large influence of interference when the secondary use candidate frequency is used, and estimates the path loss between the transmitting station and the receiving station (the path loss between the secondary transmitting station and the primary receiving station or the path loss between the primary transmitting station and the primary receiving station) using the propagation model (step S14).

Thereafter, the path loss correcting unit 106 performs the actual measurement correction on the path loss estimation value between the secondary transmitting station 10 and the primary receiving station 21 calculated in step S14. At this time, the monitoring station 11 positioned around the primary receiving station 21 of the protection target is first specified. Then, it is searched to determine whether the reception power of the signal of the secondary transmitting station 10 measured by the monitoring station 11 is held in the frequency/time-associated measurement result storage unit 104.

In the first embodiment of the present invention, the reception power of the secondary signal measured at the frequency different from the frequency used by the primary receiving station 21 of the protection target or the reception power measured in a period of time different from a period of time used by the primary receiving station 21 of the protection target is used for correction of the path loss between the secondary transmitting station 10 and the primary receiving station 21.

For example, the reception power measurement value of the secondary signal measured at a frequency (channel) adjacent to a frequency used by the primary receiving station 21 of the protection target is used for the path loss correction.

Further, when the reception power measurement results of the secondary signal measured at a plurality of frequencies including a frequency used by the primary receiving station 21 are available or when the reception power measurement results of the secondary signal measured in a plurality of periods of time including a period of time used by the primary receiving station 21 are available, the reception power measurement value of the secondary signal which is determined as having a high measurement accuracy based on the measurement accuracy information is used. The path loss correcting unit 106 corrects the path loss estimation value calculated in step S14 using the difference between the reception power measurement value of the secondary signal and the reception power estimation value of the secondary signal (the reception power estimation value of the secondary signal calculated based on the path loss estimation value between the secondary transmitting station 10 and the monitoring station 11) in the monitoring station 11 calculated based on the path loss estimation as the correction value (step S15).

In addition, when the actual measurement correction of the path loss estimation value between the primary transmitting station 20 and the primary receiving station 21 is performed in step S15, the path loss correcting unit 106 searches whether the reception power measurement value of the signal of the primary transmitting station 20 measured by the specified monitoring station 11 is held in the frequency/time-associated measurement result storage unit 104.

In the first embodiment of the present invention, the reception power of the primary signal measured at the frequency different from the frequency being used by the secondary transmitting station (the secondary transmitting station 10 or another secondary transmitting station) or at the time different from the period of time being used by the secondary transmitting station is used for correction of the path loss.

Further, when the reception powers of the primary signal measured at a plurality of frequencies including a frequency used by the secondary receiving station are available or when the reception powers of the primary signal measured in a plurality of periods of time including a period of time used by the secondary receiving station are available, the path loss correcting unit 106 uses the reception power measurement value of the primary signal which is determined as having a high measurement accuracy based on the measurement accuracy information. The path loss correcting unit 106 corrects the path loss estimation value calculated in step S14 using the difference between the reception power measurement value of the primary signal and the reception power estimation value of the primary signal (the reception power estimation value of the primary signal calculated based on the path loss estimation value between the primary transmitting station 20 and the monitoring station 11) based on the path loss estimation as the correction value.

Thereafter, the permissible transmission power setting unit 107 calculates the permissible transmission power of the secondary transmitting station 10 using the corrected path loss estimation value between the secondary transmitting station 10 and the primary receiving station 21 and the corrected path loss estimation value between the primary transmitting station 20 and the primary receiving station 21. The obtained permissible transmission power is transmitted to the secondary transmitting station 10 via the core network 14, and the secondary transmitting station 10 sets the transmission power equal to or less than the permissible transmission power (step S16).

Figure 11:
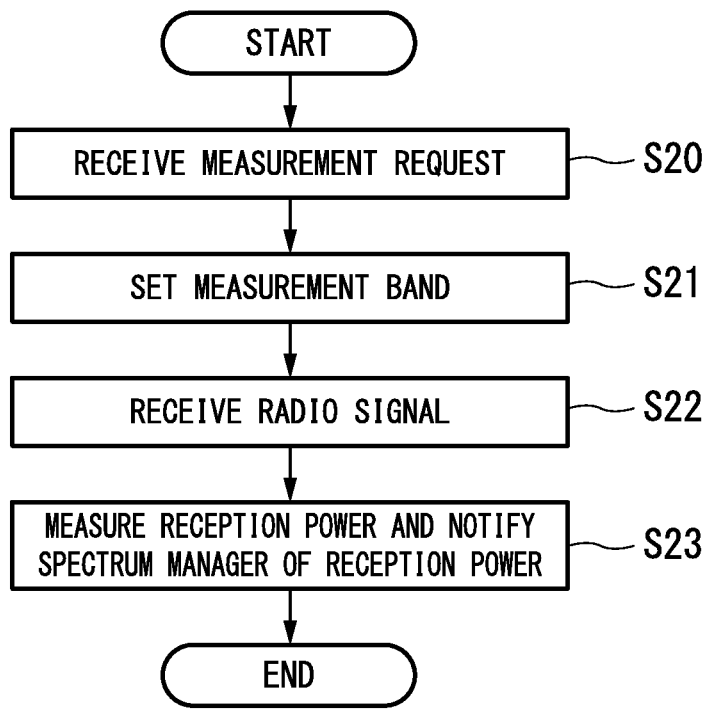
FIG. 11 is a flowchart showing exemplary processing of a monitoring station.

FIG. 11 is a flowchart illustrating an exemplary operation of the monitoring station 11. The network communication unit 151 of the monitoring station 11 receives the measurement request from the spectrum manager 12 (step S20).

Next, the measurement frequency setting unit 152 of the monitoring station 11 sets a pass band of the band pass filter of the receiving RF unit 153 to a frequency designated by the measurement request in order to receive a radio signal of the frequency (step S21).

Then, the monitoring station 11 receives the radio signal through an antenna, and converts the radio signal of the measurement target frequency into a digital baseband signal through the receiving RF unit 153 (step S22). Then, the reception power measuring unit 154 of the monitoring station 11 measures the reception power of the secondary signal or the reception power of the primary signal using the digital baseband signal of the measurement target, and notifies the spectrum manager 12 of the measured reception power through the network communication unit 151 via the core network 14 (step S23).

According to the above-described first embodiment, when the path loss estimation value is corrected in the propagation path from the secondary transmitting station to the primary receiving station, the path loss value at the first frequency is estimated, and the reception power of the secondary signal measured by the monitoring station at a different frequency (second frequency) or in a different period of time which is small in the reception power of a second primary signal included in the same frequency band as the secondary signal is used for the actual measurement correction of the path loss. As a result, compared to when the reception power of the secondary signal is measured, measurement can be performed in an environment in which reception power of other signals is small using the first frequency used in the primary system service area around the monitoring station, and thus the measurement error of the reception power of the secondary signal is reduced. In other words, the actual measurement correction can be performed on the path loss estimation value in the propagation path from the secondary transmitting station to the primary receiving station with a high degree of accuracy.

Similarly, when the path loss estimation value is corrected in the propagation path from the primary transmitting station to the primary receiving station, the path loss value at the different third frequency is estimated, and the monitoring station measures the reception power of the primary signal at a different frequency (the fourth frequency) or in a different period of time which is small in the reception power of the signal (the secondary signal) other than the measurement target. As a result, measurement can be performed in an environment in which reception power of the signal other than the measurement signal is small, and thus the measurement error of the reception power of the secondary signal is reduced. In other words, the actual measurement correction can be performed on the path loss estimation value in the propagation path from the primary transmitting station to the primary receiving station with a high degree of accuracy. Accordingly, the CIR estimation error can be reduced, the margin which needs to be set to the permissible transmission power of the secondary transmitting station can be reduced, and thus the permissible transmission power can be increased.

In the above description, the CIR of the primary receiving station is used as the reception quality used to set the permissible transmission power, but the permissible transmission power may be set so that the CINR is equal to or more than a certain value, or the permissible transmission power may be set so that the interfered amount of the primary receiving station is equal to or less than a certain value. Further, the permissible transmission power may be set so that a deterioration degree of the CIR of the CINR of the primary receiving station occurring due to transmission of the secondary transmitting station is suppressed to be equal to or less than a certain value.

Further, in the first embodiment of the present invention, a leak outside a band to a frequency adjacent (neighboring) to the transmission frequency of the secondary transmitting station or interference (frequency sharing related to an adjacent channel with the primary system) between adjacent channels caused by adjacent channel selectivity (a characteristic of a receiving filter that acquires a signal up to a frequency adjacent to a desired frequency) of the receiving filter of the primary receiving station may be considered in addition to interference between the same channels (frequencies).

Generally, when interference between adjacent channels is considered, the permissible transmission power is decided so that the reception quality is maintained to be equal to or more than a certain value using the ratio of the reception power of the primary signal at the frequency of the primary receiving station and the reception power of the secondary signal in the primary receiving station at the frequency adjacent to the frequency of the primary receiving station as the reception quality, and interference between adjacent channels is avoided.

In this case, according to the method of the first embodiment of the present invention, the monitoring station measures the reception power of the secondary signal at the frequency (which is adjacent to the frequency used by the primary receiving station and used to transmit the secondary signal, for example) different from the frequency used by the primary receiving station, and measures the reception power of the primary signal at the frequency (which is used by the primary receiving station, for example) different from the frequency used to transmit the secondary signal, and thus it is possible to perform measurement in which the measurement error of each reception power is reduced, and it is possible to perform actual measurement correction on the path loss estimation value using the measurement result with a high degree of accuracy.

Further, in the first embodiment of the present invention, the reception power of the secondary signal measured at the frequency (period of time) which is used by the primary receiving station of the protection target but different from the first frequency (period of time) which is the frequency used to estimate the path loss is used for the path loss correction, but the following embodiment is possible as well. For example, for the frequency when the primary receiving station of the protection target is in the service area, the reception power of the secondary signal measured at the frequency different from each frequency corresponding to the service area can be used for the path loss correction. For example, in the example of FIG. 2, since the primary receiving station 21_6 stays in the service areas of the frequencies f6 and f13, it means that measurement at the frequency of the primary system other than the frequencies f6 and f13 is performed. Here, the service area may be a service area of a plurality of primary transmitting stations, and the service area of the single primary transmitting station need not be the only target. Further, when the primary receiving station of the protection target and the monitoring station enter different service areas, the reception power of the secondary signal measured by the monitoring station at the frequency different from the frequency included in the service area may be used for the path loss correction. Further, the following embodiment is possible. For example, for one or more primary transmitting stations when the primary receiving station of the protection target is in the service area, the reception power of the secondary signal measured at the frequency different from each frequency being used in the primary transmitting station can be used for the path loss correction.

<Second Embodiment>

In a second embodiment of the present invention, measurement accuracy information used for correction of the path loss estimation value is different from that in the first embodiment, and the ratio of a reception signal power estimation value of a measurement target to a reception power estimation value of other signals is used as the measurement accuracy information. For clear description, only different points from the first embodiment will be described.

In the first embodiment of the present invention, an interference to carrier ratio (ICR) which is the ratio of the reception power estimation value of the secondary signal and the reception power estimation value of the primary signal calculated based on the path loss estimation is used as the measurement accuracy information of the reception power measurement value of the secondary signal. Meanwhile, a CIR estimation value which is the ratio of the reception power estimation value of the primary signal and the reception power estimation value of the secondary signal calculated based on the path loss estimation is used as the measurement accuracy information of the reception power measurement value of the primary signal.

FIG. 12 illustrates an exemplary frequency-associated measurement result held in the frequency/time-associated measurement result storage unit 104 according to the second embodiment of the present invention. The measurement result is held for each combination of the secondary transmitting station 10 and the monitoring station 11.

In this example, similarly to the example of FIG. 4, the measurement results of the measurement frequencies f4, f5, f6, and f13 are shown. Here, the measurement results include the reception power measurement value of the secondary signal and the reception power measurement value of the primary signal. Similarly to the first embodiment, the ICR estimation value used as the measurement accuracy information of the reception power measurement value of the secondary signal is defined as the ratio of the reception power estimation value of the secondary signal and the reception power estimation value of the primary signal, and defined as the difference therebetween when the reception power is represented by dBm. Further, when the ICR estimation value is high, the reception power measurement value is determined as having the high measurement accuracy. Meanwhile, the CIR estimation value (the CIR estimation value which is the reciprocal of the ICR estimation value represented by a true value) which is a value obtained by inverting the sign of the ICR estimation value represented by dB is used as the measurement accuracy information of the reception power measurement value of the primary signal. In this case, when the CIR estimation value is high, the reception power measurement value is determined as having the high measurement accuracy.

Figure 13A:
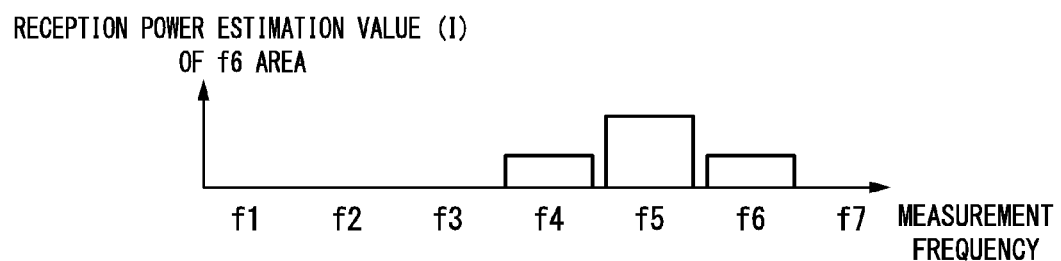
FIG. 13A is a diagram showing the reception power of a secondary signal for each frequency.
Figure 13B:
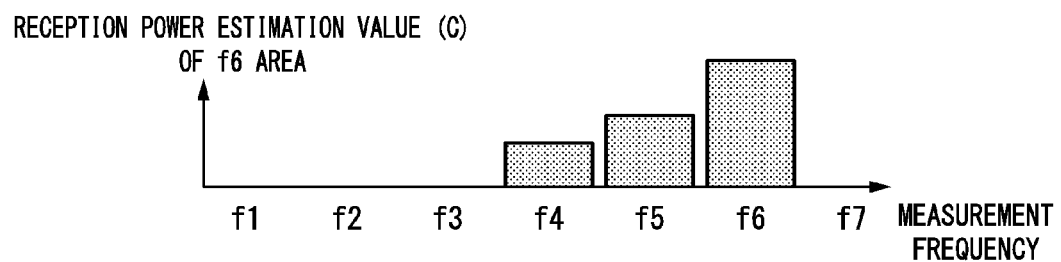
FIG. 13B is a diagram showing the reception power of a primary signal for each frequency.

FIGS. 13A and 13B illustrate the examples of the reception power estimation value of the secondary signal and the reception power estimation value of the primary signal illustrated in FIG. 12 according to each measurement frequency. FIGS. 13A and 13B illustrate the examples of the reception power estimation value of the secondary signal and the reception power estimation value of the primary signal in which the arrangement of the secondary transmitting station 10, the monitoring station 11, and the respective primary transmitting stations 20 (20_4, 20_5, and 20_6) is considered.

Since the reception power estimation value of the primary signal is the same as in FIG. 5, and thus a description thereof is omitted, the description will proceed with the reception power estimation value of the secondary signal. In FIG. 2, the distance from the position of the secondary transmitting station 10 to the edge of the service area of the frequency f5 is larger than the distance from the position of the secondary transmitting station 10 to the edges of the service areas of the frequencies f4 and f6, and thus it is considered to be larger in the path loss. Thus, since the permissible transmission power is highest when the frequency f5 is used, the frequency f5 is higher in the reception power estimation value of the secondary signal in the monitoring station 11 than the other frequencies (f4 and f6).

Here, in the second embodiment of the present invention, when the ICR estimation value which is the measurement accuracy information of the reception power measurement value of the secondary signal is considered, in the example of FIGS. 13A and 13B, the ICR estimation value is highest at the frequency f5, and thus the reception power measurement value of the secondary signal of the frequency f5 is used for the actual measurement correction. Meanwhile, the CIR estimation values which are the measurement accuracy information of the reception power measurement value of the primary signal for the frequencies f6 and f13 are similarly calculated based on the reception power estimation value of the secondary signal and the reception power estimation value of the primary signal, and the reception power measurement value of the primary signal which is highest in the CIR estimation value is used for the actual measurement correction.

According to the second embodiment of the present invention described above, the ICR estimation value is used as the measurement accuracy information of the reception power measurement value of the secondary signal, and the CIR estimation value is used as the measurement accuracy information of the reception power measurement value of the primary signal. Since the reception power of the measurement target signal can be considered in addition to the reception power estimation value (the reception power estimation value of the secondary signal or the reception power estimation value of the primary signal) of the other signal which is the measurement accuracy information described in the first embodiment, the measurement error can be further reduced.

Further, instead of the ICR estimation value or the CIR estimation value, an interference to carrier plus noise ratio (ICNR) or a CINR estimation value may be used as the measurement accuracy information.

According to the first and second embodiments described above, the reception power measurement accuracy of the signal of the secondary transmitting station or the reception power measurement accuracy of the signal of the primary transmitting station by the monitoring station can be improved. As a result, the estimation value of the path loss in the propagation path from the secondary transmitting station to the primary receiving station or the estimation value of the path loss in the propagation path from the primary transmitting station to the primary receiving station can be corrected with a high degree of accuracy, and the permissible transmission power can be increased.

Further, in the first and second embodiments described above, the primary system and the secondary system employ different radio access technologies (RATs) or employ the same RAT. As an example in which the different RATs are employed, there is a combination of the television broadcast system and the cellular system as described above. As an example in which the same RAT is employed, there is an example in which the primary system is a macro cell, and the secondary system is a femto cell installed therein.

Further, in the first and second embodiments, the spectrum manager and the monitoring station constitute a part of the secondary system, but the spectrum manager and the monitoring station may be in a separate wireless system outside the secondary system. For example, the spectrum manager, the geographical database, and the monitoring station may be a third system that provides a plurality of secondary systems with frequency management based on the path loss estimation and the actual measurement correction.

Further, the first and second embodiments may be implemented by certain hardware such as a circuit.

Further, the first and second embodiments may be controlled and operated by a computer circuit (not shown) such as a central processing unit (CPU) based on a control program. In this case, the control program is stored in a storage medium (for example, a read only memory (ROM) or a hard disk) in a device or a system or an external storage medium (for example, a removable medium or a removable disk), and read and executed by the computer circuit.

The present invention is not limited to the above embodiments, and various changes or applications can be made within the scope not departing from the gist of the invention.

INDUSTRIAL APPLICABILITY

In a system in which communication is performed through the same shared frequency, a path loss value can be estimated with a high degree of accuracy.

Priority is claimed on Japanese Patent Application No. 2011-127739, filed Jun. 7, 2011, the content of which is incorporated herein by reference.

DESCRIPTION OF REFERENCE SYMBOLS 10 secondary transmitting station
11 monitoring station
12 spectrum manager
13 geographical database
14 core network
20 primary transmitting station
20_1 primary transmitting station
20_2 primary transmitting station
20_3 primary transmitting station
20_4 primary transmitting station
20_5 primary transmitting station
20_6 primary transmitting station
20_7 primary transmitting station
21 primary receiving station
21_1 primary receiving station
21_2 primary receiving station
21_3 primary receiving station
21_4 primary receiving station
21_5 primary receiving station
21_6 primary receiving station
21_7 primary receiving station
22_1 primary system service area
22_2 primary system service area
22_3 primary system service area
22_4 primary system service area
22_5 primary system service area
22_6 primary system service area
22_7 primary system service area
101 network communication unit
102 monitoring station deciding unit
103 measurement accuracy calculating unit
104 frequency/time-associated measurement result storage unit
105 path loss estimating unit
106 path loss correcting unit
107 permissible transmission power setting unit
151 network communication unit
152 measurement frequency setting unit
153 receiving RF unit
154 reception power measuring unit

What is claimed is:

1. A wireless communication system in which a secondary system shares the same frequency as a frequency of a transmitting station of a primary system, and permissible power of a transmission signal of the secondary system is controlled so that the transmission signal of the secondary system does not cause the primary system to undergo interference, the wireless communication system comprising:

the primary system comprising at least the transmitting station of the primary system and a receiving station of the primary system; and the secondary system comprising a transmitting station of the secondary system, a spectrum manager that manages a transmission signal received from the transmitting station of the secondary system, and a monitoring station that is arranged in or around a service area of the transmitting station of the primary system and measures reception power of the transmission signal received from the transmitting station of the secondary system, wherein the spectrum manager estimates a path loss value between the transmitting station of the secondary system and the receiving station of the primary system at a first frequency, corrects the estimated path loss value between the transmitting station of the secondary system and the receiving station of the primary system using one of a reception power value of a radio signal of the transmitting station of the secondary system which is transmitted at a second frequency of the transmitting station of the primary system different from the first frequency and a reception power value of the transmission signal received from the transmitting station of the secondary system which is transmitted in a period of time in which the transmitting station of the primary system does not use the first frequency, and calculates permissible transmission power of the transmitting station of the secondary system using the corrected path loss value, wherein the monitoring station further measures reception power of a transmission signal received from the transmitting station of the primary system, and the spectrum manager further estimates the path loss value between the transmitting station of the primary system and the receiving station of the primary system at a third frequency, and corrects the estimated path loss value between the transmitting station of the primary system and the receiving station of the primary system using a reception power value of a radio signal of the transmitting station of the primary system which is transmitted at a fourth frequency of the transmitting station of the secondary system different from the third frequency or a reception power value of the transmission signal received from the transmitting station of the primary system which is transmitted in a period of time in which the transmitting station of the secondary system does not use the third frequency.

2. A spectrum manager that manages a secondary system that shares the same frequency as a frequency of a transmitting station of a primary system, comprising:

a communication unit that receives a reception power value measured by a monitoring station positioned in or around a service area of the transmitting station of the primary system;

a path loss estimating unit that estimates a path loss value between a transmitting station of the secondary system and a receiving station of the primary system at a first frequency;

a measurement result storage unit that holds the reception power value measured by the monitoring station;

a path loss correcting unit that corrects the estimated path loss value between the transmitting station of the secondary system and the receiving station of the primary system using one of a reception power value of a radio signal of the transmitting station of the secondary system which is transmitted at a second frequency of the transmitting station of the primary system different from the first frequency and a reception power value of a radio signal of the transmitting station of the secondary system which is transmitted in a period of time in which the transmitting station of the primary system does not use the first frequency; and a permissible power setting unit that calculates permissible transmission power of the transmitting station of the secondary system using the corrected path loss value.

3. The spectrum manager according to claim 2,
wherein the measurement result storage unit holds reception power values of radio signals of the transmitting station of the secondary system with one of first measurement accuracy information for a plurality of frequencies and second measurement accuracy information for a plurality of periods of time, and
the path loss correcting unit extracts a reception power value having a high measurement accuracy based on the one of the first measurement accuracy information and the second measurement accuracy information from the reception power values of the radio signals of the transmitting station of the secondary system held for the plurality of frequencies or the reception power values of the radio signals of the transmitting station of the secondary system held for the plurality of periods of time, and corrects the estimated path loss value between the transmitting station of the secondary system and the receiving station of the primary system using the reception power value having the high measurement accuracy.

4. The spectrum manager according to claim 3,
wherein the one of the first measurement accuracy information and the second measurement accuracy information is an estimation value of reception power of a radio signal which is transmitted from the transmitting station of the primary system and estimated in the monitoring station, and
the path loss correcting unit uses a reception power value of a radio signal of the transmitting station of the secondary system associated with a small estimation value of reception power for path loss correction.

5. The spectrum manager according to claim 3,
wherein the one of the first measurement accuracy information and the second measurement accuracy information is a measurement value of reception power of a radio signal which is transmitted from the transmitting station of the primary system and measured by the monitoring station, and
the path loss correcting unit uses a reception power value of a radio signal of the transmitting station of the secondary system associated with a small measurement value of reception power for path loss correction.

6. The spectrum manager according to claim 3,
wherein the one of the first measurement accuracy information and the second measurement accuracy information is an estimation value of reception power of a radio signal which is transmitted from the transmitting station of the secondary system and estimated in the monitoring station, and
the path loss correcting unit uses a reception power value of the radio signal of the transmitting station of the secondary system associated with a large estimation value of reception power for path loss correction.

7. The spectrum manager according to claim 3,
wherein the one of the first measurement accuracy information and the second measurement accuracy information is a power ratio of an estimation value of reception power of a radio signal which is transmitted from the transmitting station of the secondary system and estimated in the monitoring station and an estimation value of reception power of a radio signal which is transmitted from the transmitting station of the primary system and estimated in the monitoring station, and
the path loss correcting unit uses a reception power value of the radio signal of the transmitting station of the secondary system associated with a large power ratio for path loss correction.

8. The spectrum manager according to claim 2, further comprising,
a monitoring station deciding unit that decides a monitoring station that is to measure reception power from among a plurality of monitoring stations,
wherein the monitoring station deciding unit specifies a monitoring station which is positioned in or around a service area of the frequency of the transmitting station of the primary system and a monitoring station which is positioned in or around a service area of a frequency different from the frequency of the transmitting station of the primary system and undergoes interference when the transmitting station of the secondary system performs transmission at the different frequency based on positional information of the monitoring station that is to measure the reception power.

9. The spectrum manager according to claim 2,
wherein the path loss estimating unit further estimates a path loss value between the transmitting station of the primary system and the receiving station of the primary system at a third frequency, and
the path loss correcting unit corrects the estimated path loss value between the transmitting station of the primary system and the receiving station of the primary system using one of a reception power value of a radio signal of the transmitting station of the primary system which is transmitted at a fourth frequency of the transmitting station of the secondary system different from the third frequency and a reception power value of a radio signal of the transmitting station of the primary system which is transmitted in a period of time in which the transmitting station of the secondary system does not use the third frequency.

10. The spectrum manager according to claim 9,
wherein the measurement result storage unit further holds reception power values of radio signals of the transmitting station of the primary system with one of a first measurement accuracy information for a plurality of frequencies and a second measurement accuracy information for a plurality of periods of time, and
the path loss correcting unit extracts a reception power value having a high measurement accuracy based on the one of the first measurement accuracy information and the second measurement accuracy information from the reception power values of the radio signals of the transmitting station of the primary system held for the plurality of frequencies or the reception power values of the radio signals of the transmitting station of the primary system held for the plurality of periods of time, and corrects the estimated path loss value between the transmitting station of the primary system and the receiving station of the primary system using the reception power value having the high measurement accuracy.

11. The spectrum manager according to claim 10,
wherein the one of the first measurement accuracy information and the second measurement accuracy information is an estimation value of reception power of a radio signal which is transmitted from the transmitting station of the secondary system and estimated in the monitoring station, and the path loss correcting unit uses a reception power value of a signal of the transmitting station of the primary system associated with a small estimation value of reception power for path loss correction.

12. The spectrum manager according to claim 10,
wherein the one of the first measurement accuracy information and the second measurement accuracy information is a measurement value of reception power of a radio signal which is transmitted from the transmitting station of the secondary system and measured by the monitoring station, and the path loss correcting unit uses a reception power value of a radio signal of the transmitting station of the primary system associated with a small measurement value of reception power for path loss correction.

13. The spectrum manager according to claim 10,
wherein the one of the first measurement accuracy information and the second measurement accuracy information is an estimation value of reception power of a radio signal which is transmitted from the transmitting station of the primary system and estimated in the monitoring station, and the path loss correcting unit uses a reception power value of a radio signal of the transmitting station of the primary system associated with a large estimation value of reception power for path loss correction.

14. The spectrum manager according to claim 10,
wherein the one of the first measurement accuracy information and the second measurement accuracy information is a power ratio of an estimation value of reception power of a radio signal which is transmitted from the transmitting station of the primary system and estimated in the monitoring station and an estimation value of reception power of a radio signal which is transmitted from the transmitting station of the secondary system and estimated in the monitoring station, and the path loss correcting unit uses a reception power value of a radio signal of the transmitting station of the primary system associated with a large power ratio for path loss correction.

* * * * *